(12) United States Patent  (10) Patent No.: US 8,830,554 B2
Knoll  (45) Date of Patent: Sep. 9, 2014

(54) TWO-DIMENSIONAL ELECTROCHEMICAL WRITING ASSEMBLY AND USE THEREOF

(71) Applicant: Westfälische Wilhelms Universität Münster, Münster (DE)

(72) Inventor: Meinhard Knoll, Steinfurt (DE)

(73) Assignee: Westfälische Wilhelms Universität Münster (DE)

( * ) Notice: Subject to any disclaimer, the term of this patent is extended or adjusted under 35 U.S.C. 154(b) by 4 days.

(21) Appl. No.: 13/650,200

(22) Filed: Oct. 12, 2012

(65) Prior Publication Data

US 2013/0094072 A1  Apr. 18, 2013

(30) Foreign Application Priority Data

Oct. 14, 2011 (EP) .................................... 11008299

(51) Int. Cl.
*G02F 1/03* (2006.01)
*G02F 1/153* (2006.01)
*B82Y 20/00* (2011.01)

(52) U.S. Cl.
CPC ...................................... *B82Y 20/00* (2013.01)
USPC ............................ 359/245; 359/270; 359/272

(58) Field of Classification Search
USPC .......................... 359/245, 265, 270, 272, 274
See application file for complete search history.

(56) References Cited

U.S. PATENT DOCUMENTS 5,930,023 A  7/1999  Mitchell, Jr.

FOREIGN PATENT DOCUMENTS

| EP | 1720188 A2 | 11/2006 |
|---|---|---|
| EP | 1862786 A1 | 12/2007 |
| EP | 2120107 A1 | 11/2009 |
| WO | WO-2009/056591 A1 | 5/2009 |

OTHER PUBLICATIONS

"European Application No. 11008299.7, European Search Report dated Jan. 13, 2012", 8 pgs.
Tehrani, Payman, et al., "Printable Organic Electrochemical Circuit to Record Time-Temperature History", Electrochimica Acta 55 (2010) 7061-7066, (Jul. 30, 2010), 7061-7066.

*Primary Examiner* — Jack Dinh
(74) *Attorney, Agent, or Firm* — Schwegman Lundberg & Woessner, P.A.

(57) ABSTRACT

The present subject matter can include a two-dimensional electrochemical writing assembly and uses thereof. The writing assembly can enable for time-dependently displaying of a physical parameter, such as a time-dependent display or recording of the temperature. The writing assembly comprises two different types of electrochemical processors, of which one type is used for controlling the time-dependent switching of the second type of electrochemical processors used in the writing assembly.

20 Claims, 25 Drawing Sheets a)

| 3221 | 3222 | 3223 | 3224 | 3225 | 3226 | 3227 |
|------|------|------|------|------|------|------|
| 3101 | 3102 | 3103 | 3104 | 3105 | 3106 | 3107 |
| 3111 | 3112 | 3113 | 3114 | 3115 | 3116 | 3117 |
| 3211 | 3212 | 3213 | 3214 | 3215 | 3216 | 3217 |
| 3600 ||||||||

| 3600 ||||||||
|------|------|------|------|------|------|------|
| 3221 | 3222 | 3223 | 3224 | 3225 | 3226 | 3227 |
| 3101 | 3102 | 3103 | 3104 | 3105 | 3106 | 3107 |
| 3111 | 3112 | 3113 | 3114 | 3115 | 3116 | 3117 |
| 3211 | 3212 | 3213 | 3214 | 3215 | 3216 | 3217 |

TWO-DIMENSIONAL ELECTROCHEMICAL WRITING ASSEMBLY AND USE THEREOF

CLAIM OF PRIORITY

This application claims the benefit of priority, under 35 U.S.C. §119(a)-(d), of European Patent Application Serial No. 11 008 299.7 entitled "TWO-DIMENSIONAL ELECTROCHEMICAL WRITING ASSEMBLY AND USE THEREOF," filed on Oct. 14, 2011, the benefit of priority of which is claimed hereby, and which is incorporated by reference herein in its entirety.

TECHNICAL FIELD

The present patent application is directed to a two-dimensional electrochemical writing assembly and uses thereof.

SUMMARY

The writing assembly according to present disclosure enables for time-dependently displaying of a physical parameter, such as a time-dependent display or recording of the temperature. The writing assembly according to various examples comprises two different types of electrochemical processors, of which one type can be used for controlling the time-dependent switching of the second type of electrochemical processors used in the writing assembly. Therefore, the first type of electrochemical processor being present also is referred to as "time-line processor", whereas the second type of electrochemical processor is referred to as the "column processors". Both types of electrochemical processors are electrically connected to form an electrical circuit and/or a fluid connection of these two types of processors can be established. In an example, the electrochemical writing assembly comprises an electrochemical processor, which comprises two electrodes of different or the same electrochemical potential, which are bridged via an electrolyte. Upon, completion of the electric circuit between the two electrodes, the second electrode is oxidized and therefore changed in at least one physical parameter, e.g. the second electrode becomes transparent. The surface of the second electrode, which is in contact with the electrolyte, is partially covered with an electrically insulating material, wherein this material is adjacent to the electrolyte. Moreover, the present disclosure relates to the use of this electro-electrochemical writing assembly.

BACKGROUND

U.S. Pat. No. 5,930,023 describes an electrochemical display that comprises first and second electrode layers having different electrode potentials, an electrolyte layer overlapping said first electrode layer and forming a boundary with that first electrode layer and forming a boundary with that second electrode layer for completing an ionically conductive pathway between said first and second electrode layers, and said electrode boundary being movable together with the boundary of said second electrolyte layer extending the ionically conductive pathway from said first electrode layer in response to a flow of current between said first and second electrode layer for changing a visible appearance of the display. According to an example of the electrochemical display of the U.S. Pat. No. 5,930,023 both electrode layers are applied on a substrate and separated by a gap. An electrolyte layer, which is filled into this separating gap between the two electrodes and which partially overlaps the free surfaces of those electrodes is present for an electrical interconnection of said electrodes. However, most of the surface of the electrode layer, which is to be oxidized upon completion of the circuit pathway is exposed to a cavity inside that electrochemical display. Because of the fact that the electrolyte layer is an ionic conductor and present in the form of a paste or a gel or comparable liquid forms, the electrolyte layer is not totally rigid or solid, but exhibits certain viscoelastic properties and therefore can be distributed within the cavity, e.g. can be spread in an uncontrolled manner also on the surface of the electrode, which is exposed to said cavity. This uncontrolled distribution of the electrolyte can be affected by a plurality of factors, even by gravitation, if the electrochemical display according to the U.S. Pat. No. 5,930,023 is arranged in a way that the electrolyte can run into said cavity. However, this leads to a major drawback of this electrochemical display in a way that the reaction time of this display is dependent on how this display is arranged spatially. Also, the reaction time of this chemical display cannot be guaranteed to be constant e.g. upon mechanical impact. Therefore, a calibration of this system is hardly possible, which makes this electrochemical display rather unreliable.

OVERVIEW

According to one aspect of the present patent application, there is provided an electrochemical writing assembly, e.g. in form of an electrochemical display, which is able to time dependently display a physical parameter, such as e.g. a temperature, or record the course of a physical parameter over time. Another aspect of the present patent application describes uses of the electrochemical writing assembly.

According to an example, a two-dimensional electrochemical writing assembly is provided, comprising
a two dimensional electrochemical writing assembly, comprising
a) at least one first electrochemical processor (time-line processor) which can be activated at defined times, comprising at least one fluid, which is spreadable in at least one spatial direction after activation, at least one interconnection which is localized in at least one special direction which can be activated and/or deactivated when contacted with the fluid,
b) at least one second electrochemical processor (column processor) which is functionally connected with the at least one first electrochemical processor (time-line processor) via the at least one interconnection, which can be activated and/or deactivated via the at least one interconnection, comprising at least one fluid, which is spreadable in at least one spatial direction after activation,
wherein the activation or deactivation of the two dimensional electrochemical writing assembly is established by closing or opening of an electrical switch so the fluid of the first electrochemical processor is transported through the interconnection to activate the second electrochemical processor.

According to an example of the writing assembly, two different types of electrochemical processors are comprised, which electrically are connected or switched via an external conductive pathway. Alternatively or in addition, also a fluid connection of the two types of electrochemical processors is possible. Therefore, an electrical circuit or a fluid connection can be established throughout the first electrochemical processor as well as the second electrochemical processor or the plurality thereof.

According to an example, the second electrochemical processor comprises an indicator layer which upon activation can be contacted by the fluid being comprised in the electrochemical processor, said indicator layer changing its optical properties upon establishing contact with the fluid spreading in at least one spatial direction.

According to an example, the two-dimensional electrochemical writing assembly includes a) at least one first electrochemical processor (time-line processor) comprising
   i) a first electrode, an electrolyte which covers at least a part of the first electrode and extends beyond the first electrode in x-direction wherein the electrolyte contacts a material selected from the group consisting of materials with capillary action,
   or
   ii) a first electrode and a second electrode each having first and oppositely arranged second surfaces, wherein the first electrode and the second electrode have different or the same electrode potentials and are physically separated from each other in x-direction, an electrolyte which covers at least a part of a first surface of the first electrode and a part of the first surface of the second electrode in y-direction and electrically interconnects said first electrode with the second electrode, wherein at least a part of the first surface of the second electrode which is uncovered by the electrolyte is covered in y-direction with a material selected from the group consisting of electrically insulating materials or materials with capillary action, which borders the electrolyte, and
b) at least one second electrochemical processor (column processor) comprising at least one electrode wherein the activation of the at least one second electrochemical processor enables a lateral delamination, decomposition and/or oxidation of the electrode, wherein the first electrode of the first electrochemical processor is electrically connectable to the material or the second electrode or, if present, a third electrode, a migration electrode or a subsystem of the first electrochemical processor via an external conductive pathway which comprises a switch for completion of the electric circuit,
   each of the electrodes of the at least one second chemical processor is electrically connected to the external conductive pathway and/or each of the electrodes of the at least one second electrochemical processor is electrically connected to the material or the second electrode or, if present, the third electrode, the migration electrode or the subsystem of the first electrochemical processor.

According to an example, the terms x-, y- and z-direction refer to normal coordinates.

The terminology of this patent application distinguishes between two types of electrochemical processors, namely a first electrochemical processor and second electrochemical processors. Each of these processors can be constructed like, e.g., the processors as described in FIGS. 1 to 16. As far as the first electrochemical processor is concerned, respective reference numerals are indicated with "a", e.g. if a electrochemical processor as demonstrated in FIG. 1 is used as "first" electrochemical processor, e.g. the material 500 (migration layer) is referenced to as "500a". If, however, the second type of electrochemical processor is addressed, the material 500 (migration layer) of, e.g., the electrochemical processor as displayed in FIG. 1 is referenced to as "500b", "500c" and so on.

In an example, the first electrochemical processor comprises a first electrode, which is in physical contact with an electrolyte, which overlays at least a part of the first electrode. The part of the electrolyte that extends beyond the first electrode is in physical contact with a material, which consists of materials with capillary action, i.e. materials, which are able to soak up the electrolyte, upon which these materials become electrically conductive or conductive for the electrolyte. That is, upon activation of the writing assembly, the first electrochemical processor according to this example has a material becoming partly conductive (either electrically or for the electrolyte) upon soaking up an electrolyte, therefore, an electrolyte frontier extends across said material with capillary action. The material with capillary action can also be referred to as "migration layer".

In an example, the first electrochemical compressor comprises a first electrode and a second electrode, which are aligned next to each other.

According to this example, two electrodes are present, wherein the second electrode is selected to have an, e.g., lower electrochemical potential compared to the first electrode, i.e. these two electrodes can be referred to as a local element, wherein upon completion of an electric circuit between the first and the second electrode, a corrosion of the second electrode takes place. According to an alternative example, it is also possible that e.g. the first electrode and the second electrode have the same electrode potentials; this can be achieved e.g. in that the first and the second electrode are made of the same material, e.g. aluminium. In this alternative example, the above-mentioned delamination or oxidation of the second electrode is possible, if an additional voltage source is present within the electric circuit, which is to be completed between the first and the second electrode. These two electrodes are not in direct physical contact with each other, i.e. separated by a gap from each other. The electrical connection between these two electrodes can be accomplished by an electrolyte, which can be applied onto each first surface of those electrodes, respectively. It is also possible that the electrolyte can be present inside the gap in-between the two electrodes. An electrically insulating material can be applied onto the same surface of the second electrode, onto which the electrolyte is present. This insulating material can be a coating or a composite coating applied to the first surface of the second electrode. By this electrically insulating material, the area of the first surface of the second electrode, which can be contacted with the electrolyte is limited to the area which is uncovered by the electrically insulating material. In this aspect, the possibility that the electrolyte spreads in an uncontrolled manner over the complete first surface of the second electrode is excluded. Therefore, upon completion of the electrical circuit between the two electrodes, a controlled corrosion of the second electrode is possible. Due to the fact that the second electrode is laminated with an insulating material, upon activation of the processor, e.g. an oxidation of the second electrode and therefore, a controlled lateral delamination of the insulating material from the second electrode can occur. The second electrode will be corroded where it contacts the electrolyte at first, the corrosion will then proceed laterally in direction of the insulating material. The corrosion begins spatially where the second electrode is contacted with the electrolyte. This can lead to a channel or gap in-between the second electrode and the insulating material, into which the electrolyte infiltrates and advances with progression of corrosion of the electrode. This controlled corrosion however leads to predictable and adjustable reaction times of the electrochemical processor, i.e. the time that is needed to corrode the second electrode to a predefined extent. The insulating material, which is present on the first surface of the second electrode therefore makes the complete arrangement of the first electrochemical processor very reliable and leads to repeatable reaction times of the electrochemical processor. The activation of the processor can be achieved by, e.g., establishing an electrical contact outside of the processor, thereby electrically contacting the first and the second electrode.

Furthermore, the two-dimensional electrochemical writing assembly comprises at least one second electrochemical processor, which at least comprises at least one electrode, which, upon activation of the writing assembly, is delaminated, decomposed and/or oxidized, i.e. undergoes a transformation in substance. The electrode of the second electrochemical processor can be electrically contacted to the material selected from the group consisting of materials with capillary action (i.e. the migration layer) or the second electrode of the first electrochemical processor. If more than one processor of the type of second electrochemical processor is encompassed in a writing assembly, the plurality of these second electrochemical processors are aligned in x-direction; also the contact points, where each of the electrodes of each second electrochemical proprocessor is electrically connected to the first electrochemical processor are aligned in x-direction. In an example, the electrical connection of the second electrochemical processor to the first electrochemical processor is established at one end of the essential electrode of the second electrochemical processor. Furthermore, the electrode of the second electrochemical processor encompasses an additional electric contact, which is connected to the external conductive pathway. This electrical connection is established at the other end of the electrode of the second electrochemical processor, then the electrical connection, which establishes contact between the electrode of the second electrochemical processor and the first electrochemical processor.

One aspect of the writing assembly is that once the assembly is activated, the second electrode of the first electrochemical processor begins to delaminate, corrode or oxidize, i.e. undergoes a transformation in substance, which for example can lead to a change of its electrical resistance. This transformation in substance progresses in x-direction, i.e. in direction of the contact points, where an electrical connection to the at least one second electrochemical processor is established. In an alternative example, upon activation of the writing assembly, the electrolyte progresses into the migration layer in x-direction, e.g. the electrolyte is soaked up by the migration layer, i.e. the layer consists of a material with capillary action. Also in this case, the electrical resistance of this migration layer differs with the progression of the frontier of the electrolyte within this layer in x-direction.

When this respective frontier has reached an electrical connection of the first electrochemical processor with the second electrochemical processor, this electrical connection changes its electrical potential, which leads to an activation of the second electrochemical processor, upon which a substantial change of the electrode of the second electrochemical processor begins. Therefore, the writing assembly allows a time-dependent activation of the at least one second electrochemical processor with progression of the frontier in the first electrochemical processor. In case of a plurality of second electrochemical processors which are contacted subsequently in x-direction with regard to the first electrochemical processor, a subsequent activation of the plurality of second electrochemical processors is possible. This allows the time-dependent measurement of a physical value, which influences the velocity of the transformation in substance (such as, e.g., oxidation) of the electrode of the second electrochemical processor, an example for this physical value is for example the temperature.

Therefore, the present patent application relates to a writing assembly which uses two types of electrochemical processors in which physical, chemical and/or electrochemical processes can be carried out. These processors can be started in an electrical way or electrolytically at any time. The processors comprise, e.g., optical display elements and receive their electric energy from its layer composition and does not require any electric battery. Alternatively, an external energy source, such as a galvanic element and/or a battery, can be present in the writing assembly to power the electrochemical processes in the electrochemical processors. Microscopic as well as macroscopic systems can be implemented, the functions of which are based on the electrochemical generation of nanometric interface layers.

Each of the electrochemical processors can be realized as a layer system. The writing assembly can be used for time-dependent displaying and/or recording of a physical parameter, especially, e.g., for the following purposes:

two-dimensional display or recording of physical parameters, e.g. the temperature as function of time. The writing assembly can act as temperature logger without any external electrical source, such as a battery for example.

micro reaction engineering time indicators temperature-time integrators.

In an example, each of the at least one second electrochemical processor comprises a) a first electrode and a second electrode each having first and oppositely arranged second surfaces, wherein the first electrode and the second electrode have different or the same electrode potentials and are physically separated from each other in x-direction, b) an electrolyte which covers at least a part of a first surface of the first electrode and a part of the first surface of the second electrode in y-direction and electrically interconnects said first electrode with the second electrode, wherein at least a part of the first surface of the second electrode which is uncovered by the electrolyte is covered in y-direction with an material selected from the group consisting of electrically insulating materials or materials with capillary action which borders the electrolyte, wherein the first electrode of the first electrochemical processor is electrically connectable to the second electrode or, if present, a third electrode, a migration electrode or a subsystem of the first electrochemical processor via an external conductive pathway which comprises a switch for completion of the electric circuit, each of the first electrodes of the at least one second chemical processor is electrically connected to the external conductive pathway and each of the second electrodes or, if present each of third electrodes, each of migration electrodes or each of subsystems of each of the at least one second electrochemical processor is electrically connected to the second electrode or, if present, the third electrode, the migration electrode or the subsystem of the first electrochemical processor.

That is, the first and second processors can be of the same type.

According to another example, a third electrode having a first and an oppositely arranged second surface is aligned next to the second electrode and is physically separated from the second electrode and the first electrode, e.g. by alignment in x-direction opposite to the first electrode. Both the first and/or the second electrochemical processors can be constructed in this way. This device can be activated, if the first electrode is externally electrically contacted with the third (or the second) electrode.

This further electrode, which is present in addition to the first and second electrodes, is electrically connectable to the second electrode. This can be achieved by the presence of e.g. a migration layer, which is in direct physical contact with parts of the first surface of the second electrode and at least a part of the third electrode. As far as the migration layer is concerned, reference is made to the WO 2009/056591 A1, which describes the migration layers, the compounds used for the migration layer as well as methods for manufacturing said migration layer on e.g. an electrode, in detail. The complete content of disclosure of the WO 2009/056591 A1, is incorporated herein by reference in its entirety. In particular, the same materials as described by the WO 2009/056591 A1 can be used for the migration layer.

Furthermore, the first and/or second electrochemical processor can comprise a substrate onto which the first electrode, the second electrode and if present the third electrode are arranged with their respective second surface. The electrodes are fixed on the substrate directly. It is also possible that further layers lying in-between the substrate and the respective electrodes can be present, e.g. between the substrate and e.g. the second electrode, which can act as indicating layers, such as a graphics layer or an image. These layers can also be present on the "lower" side of the substrate, i.e. the opposite side of the substrate onto which the electrodes are applied. It is therefore preferable, if the substrate is transparent. Thus, the electrochemical processors are built in stacked type, wherein the electrodes are applied on a substrate and thereupon the electrolyte e.g. as layer is applied. The lateral dimension of such an arrangement can be referred to as the x-direction, wherein the stacking direction of these separate layers, e.g. substrate, electrodes and electrolyte, etc., can be referred to as y-direction. For example, the elapsed time can be displayed in the first electrochemical processor and the value of the desired physical parameter and, for example, the temperature can be displayed in the second electrochemical processor.

Furthermore, the first and/or second electrochemical processor can comprise an encapsulation layer, which is parallel arranged to the substrate, wherein the first electrode, the second electrode, if present the third electrode, the electrolyte as well as the insulating material are sandwiched between the substrate and the encapsulation layer in y-direction. This encapsulation layer finishes the respective processor spatially, i.e. borders the processor.

This example is an extension of the example according to which the electrodes are applied on a substrate. The encapsulation there lies on top of this afore-mentioned arrangement, i.e. borders, e.g. the electrolyte as well as the insulating material, which lies adjacent to the electrolyte.

Furthermore, it is possible that two oppositely arranged spacers are comprised in the first and/or second electrochemical processor, which delimit the electrochemical processor in x-direction, wherein one spacer and the isolating material form walls of a first reaction chamber which contains the electrolyte.

These spacers or spacing elements can be made of the same material like the substrate and/or the encapsulation layer. Furthermore, these spacers can define the spatial distance in-between e.g. the substrate and the encapsulation layer and therefore define the complete thickness of the electrochemical processor in y-direction together with substrate and encapsulation layer. Furthermore, the spacing element being adjacent to the electrolyte serves as a wall in x-direction of a first reaction chamber, which can contain the first electrolyte. The opposite wall in x-direction is formed by the boundary of the encapsulation material, which is applied on a part of the surface of the second electrode. The other boundaries or walls of this reaction chamber are e.g. formed by the first surface of the first electrode and the encapsulation layer (both are the walls in y-direction). For completion of the reaction chamber, the chamber of course is also walled in z-direction by respective walls which e.g. can be built of the same material as the substrate or the encapsulation layer.

However, it is also possible that one of these walls forming the first or second reaction chamber comprises an opening and/or are at least partially formed of a material which is vapour-permeable and/or moisture-permeable, which allows a communication of the first and/or the second reaction chamber, respectively, with the environment surrounding the electrochemical processor. This opening or window can be used for a mass exchange between the environment and the inner of the respective reaction chamber. For example, this window can be used to introduce moisture of the surrounding environment into the reaction chamber, so that this moisture can be absorbed by the electrolyte. This example can be advantageous, for example, if dry electrolytes are applied inside the reaction chamber or elsewhere inside the respective electrochemical processor, which become conductive upon absorption of water. Therefore, a processor can be provided, which can be activated in-situ, i.e. the processor is assembled with a dry electrolyte, i.e. dry polyvinyl alcohol, which becomes not conductive until the electrochemical processor is brought into the environment, in which the electrochemical processor is intended to be used.

In an example, the second spacer in y-direction can be aligned in a way that it borders the insulating material, which is applied on the first surface of the second electrode on the opposite side of the afore-mentioned reaction chamber. This means that the second spacer directly adjoins or borders the insulating material and delimits the electrochemical processor on the opposite side as the first spacer in x-direction.

In an alternative example, this second spacer is separated from the insulating material, i.e. a certain cavity between the insulating material and the second spacer (in x-direction) is present. This means that the insulating material and the second spacer form walls in x-direction for a second cavity, i.e. a second reaction chamber. The other walls of this second reaction chambers are comparable to the walls of the afore-mentioned first reaction chamber, i.e. in y-direction, these walls are e.g. the substrate and encapsulation layer, whereas in z-direction, respective elements are present which close the second reaction chamber.

In an example, the second reaction chamber of either the first and/or second electrochemical processor can be filled at least partially with a second electrolyte being the same as the first electrolyte or different from the first electrolyte. Furthermore, the second reaction chamber can be filled with a reactant.

Reactants can be substances that inter-act physically or chemically with the first electrolyte being present e.g. in the first reaction chamber.

In an example, in either of the first and/or second electrochemical processor a swelling layer and/or at least one swelling element is arranged between the second electrode and the insulating material. This swelling layer can be present in-between the total area in which the isolating material covers the first surface of the second electrode. Alternatively, it is also possible that this layer only is present in a certain region of the second electrode. Instead of a layer, also punctual or two-dimensional swelling elements can be present. The materials of these swelling layers or swelling elements are designed in a way that their volume, upon contact with an electrolyte, such as comprised in the first reaction chamber, will increase.

Alternatively or additionally to the swelling layer or the swelling element, it is also possible that an electrically insulating layer is arranged between the second electrode and the insulating material. This insulating layer is composed of a material which has a lower viscosity compared to the insulating material. Therefore, this layer can be referred to as "soft" insulating layer. Materials of this soft insulating layer are among others soft polymer layers, i.e. polymers with a relatively low degree of polymerisation, especially e.g. PVC. However, also oils, fats or water-in-oil emulsions are materials that can be used in some examples.

Both afore-mentioned examples, i.e. swelling layer/elements or soft insulating layer have the effect that the temperature-dependent delamination or oxidation and therefore the velocity of delamination or oxidation of the second electrode is increased.

In an example, the first and/or second electrochemical processor comprises a migration layer, which is aligned on a part of the first surface of the second electrode and at least a part of the first surface of the third electrode. As far as this migration layer is concerned, e.g. the materials of this migration layer or the dimensions, etc., explicit reference is made to the WO 2009/056591 A1, the content of which is hereby incorporated herein by reference in its entirety.

This migration layer comprises materials or is composed of materials which can become ionic conductive under certain conditions, such as wetting. One example is celluloses. Due to the fact that this migration layer contacts both second and third electrode, therefore, an electrical conductive pathway can be established between the second and third electrode, if ions are present in the migration layer.

In an example, in the first and/or second electrochemical processor the first surface of either the second electrode and/or if present the third electrode is at least partially covered with a covering layer; or covering elements are embedded in the first surface of said electrodes.

Furthermore, also the possibility is encompassed that in the first and/or second electrochemical processor a migration electrode or a reactive subsystem is comprised, which is physically connected with the second electrode.

The first and/or second electrochemical processor the first electrode, the second electrode and/or the third electrode is designed as layer with a layer thickness between 10 and 100.000 nm in some examples, between 20 and 1.000 nm in some examples, and between 30 and 500 nm in some examples. For the first electrode the thickness of the layer is 1 to 100 μm in some examples, for the other ($2^{nd}$, $3^{rd}$) electrodes if the thickness of the layer is 10 to 100 nm in some examples.

The writing assembly comprises an external conductive pathway, over which the first electrode is connectable to either the migration layer, the second electrode, the third electrode, the migration electrode or the subsystem of the first electrochemical processor, respectively. In addition, also the electrodes of the second electrochemical processor are electrically connected to this pathway. This pathway can be composed of any of an electrically conductive material and can be in the form of a wire, a conductive layer, structures on a printed circuit board, etc. or combinations thereof. This external conductive pathway furthermore comprises a switch for completion of the electric circuit, upon which the chemical reaction inside the electrochemical processor is initialized, e.g. the corrosion of the second electrode of the first electrochemical processor begins. The electrical connections can also be replaced by fluid connections.

Materials for each of the components of the processor are given in the following:

The first electrode and/or the third electrode comprises a material or is composed of a material selected from the group consisting of graphite carbon black, a two component material comprising graphite and an (meth)acrylic resin; electrically conductive polymers, e.g., poly(3,4-ethylenedioxy) thiophene (PEDOT), poly(3,4-ethylenedioxythiophene)-poly(styrenesulfonate) (PEDOT:PSS), poly-aniline, doped polyaniline (PANI), such as polyaniline doped with 4-dodecylbenzoesulfonic acid (PANI:DBSA); and/or metals, such as aluminium or tantalum.

The second electrode comprises a material or is composed of a material selected from the group consisting of metals, such as aluminium, tantalum or electrically conductive polymers, e.g., poly(3,4-ethylenedioxy)thiophene (PEDOT), poly (3,4-ethylenedioxythiophene)-poly(styrenesulfonate) (PEDOT:PSS), poly-aniline, doped polyaniline (PANI).

The materials have the following standard potentials (eV):
Aluminium: −1.66V
PEDOT:PSS: 0.19V If the electrochemical potential of the electrodes is to be selected in that the electrodes have different electrode potentials, the materials of e.g. the first and the second electrode are selected to differ by at least 0.1 V in some examples, at least 0.5 V in some examples, at least 1 V in some examples, to guarantee a sufficient delamination or oxidation of the second electrode. The electrochemical potentials of the electrodes are determined by measurement of the respective potentials against the standard hydrogen electrode.

If the electrode potential of the electrodes is to be selected to be the same, in some examples the first and the second electrode are composed of the same material, e.g. both electrodes are made of aluminium.

If metal electrodes are used for the first and/or the second electrode, these electrodes can have a thickness of 1 μm or less, e.g. a thickness from 0.005 μm to 1 μm, e.g. 0.01 μm. These metal layers, e.g. aluminium layers, can be deposited by vapour deposition, e.g. onto the substrate.

An example of a combination of materials is e.g. PEDOT: PSS for the first electrode and Al for the second electrode. The potential difference between these materials is approximately 1 V, which is sufficient to cause anodic oxidation of the second electrode upon completion of the electric circuit.

The first electrolyte and/or the second electrolyte comprises inorganic salts, e.g., NaCl, $CaCl_2$, $LiClO_4$; acids, e.g., weak acids; polyelectrolytes and/or ionic liquids;, wherein the first electrolyte is a solution or a gel of said inorganic salts and/or said acids, wherein the solution or gel can contain additives, such as alkylene glycols, e.g. ethylene glycol or glycerol, or mixtures of water-ethylene glycol and/or glycerol, and/or thickeners, such as polyvinyl alcohols and/or polysaccharides, such as cellulose and/or starch, water-free electrolytes on the basis of N,N-dimethylformamid, N,N-dimethylacetamid and/or γ-butyrolacton. Thickeners allow a printing of the electrolyte. The thickening of the electrolyte enables applying the electrolyte via printing techniques, e.g. screen printing methods, etc. In examples where non-aqueous electrolytes are used, the moisture of the surrounding environment can be used to wetten the electrolyte to become conductive.

The electrically insulating material and/or the spacers comprise a material or is composed of a material selected from the group consisting of a polyester, polyethylene, polypropylene and/or a lacquer of a resin, e.g., a (meth)acrylic resin, a copolymeric resin comprising a (meth)acrylate and/or a polyurethane. In an example, the insulating material is transparent.

The substrate comprises a material or is composed of a material selected from the group consisting of a plastic material, e.g., polyethylene, polypropylene, coextruded polyethylene, coextruded polypropylene, polyethylene terephthalate, polyethylene naphthalene dicarboxylate, polyvinylchloride, polycarbonate and/or polyamide; paper, coated paper, glass or a ceramic material.

The encapsulation layer comprises a material or is composed of a material selected from the group consisting of a plastic material, e.g., a polyethylene, polyester, a laquer on basis of a (meth)acrylate resin, (meth)acrylatecopolymers and/or polyurethanes, wherein said material is transparent.

The swelling layer and/or the at least one swelling element comprises a material or is composed of a material selected from the group consisting of materials that increase its volume upon contact with water or the electrolyte, e.g., polyvinyl alcohol.

The migration layer comprises a material or is composed of a material selected from the group consisting of materials that increase its volume upon contact with water or the electrolyte, e.g., polyvinyl alcohol.

The covering layer and/or the at least one covering element comprises a material or is composed of a material selected from the group consisting of graphite carbon black, aluminium or electrically conductive polymers, e.g., poly(3,4-ethylenedioxy)thiophene (PEDOT), poly(3,4-ethylenedioxythiophene)-poly-(styrenesulfonate) (PEDOT:PSS), polyaniline, doped polyaniline (PANI).

The migration electrode comprises a composite material comprising at least one electrically conductive polymer in combination with a ion conductive polymer, e.g., a composite of polyaniline and polyvinyl alcohol, a composite of PEDOT:PSS and polyvinyl alcohol and/or combinations thereof.

The subsystem is composed of substances which show a physical change of at least one material property or undergo a chemical reaction upon contact with an electrolyte and/or an aqueous solution, e.g., a colour indicator, a substance or composition producing an exothermic reaction, a substance or composition producing an increase in its volume.

Additionally, the afore-mentioned pathway can comprise at least one voltage source, such as a galvanic element and/or a battery. The voltage source can attribute to the difference of the electrochemical potentials of e.g. the first and the second electrode of the first and/or second electrochemical processor and thus enable or assist the delamination or oxidation of e.g. the second electrode upon completion of the electrical circuit. This example especially is useful, when the first and second electrode only have slightly different electrochemical potentials or the same electrochemical potentials. This example is necessary if e.g. the electrochemical potential of the first and/or second (and, if present, the third) electrode is the same, since e.g. the same materials are used for the electrodes. If, however, materials are used for the respective electrodes, which have different electrochemical potentials, the presence of a voltage source is not mandatory.

In an example, it is possible that e.g. the second and/or the third electrode—if present—are made of a metal, such as e.g. aluminium or titanium, wherein at least a part of the first surface of said electrodes is oxidised. According to this "pre-oxidation" of the second or third electrode, a better or faster oxidation upon completion of the electrical circuit, e.g. the activation of the electrochemical processor, is possible. Also, the temperature dependency of the oxidation of the afore-mentioned electrodes is decreased.

In an example, the second electrode and/or, if present, the third electrode of the first and/or second electrochemical processor, can comprise at least one electrical connection, which is arranged in the z-direction. According to this example, electrical contact points are arranged in z-direction of the afore-mentioned electrodes. These electrical contact points can be made of any electrically conducting material, however, in one example, these contact points are made of the same material as the second electrode or, if present, the third electrode. Therefore, in one example if e.g. also these contact points are made of a metal, such as e.g. aluminium.

Furthermore, it is also possible that at least one electrical connection is provided on the second electrode and/or, if present, the third electrode, wherein these electrical connections are arranged in the x-direction. These contact points can be provided by incisions of the respective electrodes in x-direction. These incisions can have the same length, however, in order to provide different electrical points, these incisions also can have different lengths, with respect to the x-direction.

The second electrochemical processor can be identical with the first electrochemical processor. In this example, the second electrode of the second electrochemical processor can be electrically connected with the second electrode of the first processor. However, if e.g. a second electrochemical processor comprises a third electrode, the third electrode of the electrochemical processor is connected with the second electrode of the first processor and vice versa. The other end of the second electrochemical processor, i.e. the first electrode of the electrochemical processor can be electrically connected to the external conductive pathway.

The electrical inter-connection between the first and the second electrochemical processor is achieved via an electrical contact point, which is aligned somewhere in x-direction of the second electrode (or the third electrode etc. if present).

According to this example, the first electrochemical processor acts as "time-axis", i.e. it acts as timer or time-line processor for the activation and/or deactivation of the delamination or oxidation of e.g. the second electrode of the second electrochemical processor.

According to examples of the writing processor, a more detailed and tailor-made control of the time-dependent activation and/or deactivation of the second electrochemical processor or the plurality of the second electrochemical processors will be given in detail.

The writing processor comprises at least one electrochemical processors in some examples, at least two electrochemical processors in some examples, at least three second electrochemical processors in some examples, wherein the at least two electrochemical processors, and the at least three second electrochemical processors are aligned parallel and/or equidistant and/or the electrical connection is aligned equidistant in x-direction on the second electrode or, if present, the third electrode, the migration electrode or the subsystem of the first electrochemical processor. This assembly especially is useful in time-dependent measurement or recording of the temperature.

According to this example a plurality, i.e. at least two, at least three or more, such as 10, 20, 30, 40, 50, 60 or more second electrochemical processors are parallelly aligned next to each other. In an example, the plurality of second electrochemical processors also is aligned equidistant. Everyone of the second electrochemical processors is electrically connected or in fluid connection with the first electrochemical processor as described above. The electrical contact points, which guarantee the electrical connection of the first and the second electrochemical processor are aligned equidistant on e.g. the second electrode of the first electrochemical processor (or the third electrode of the first electrochemical processor, if present), so that with progress of the delamination or oxidation of the second electrode of the first electrochemical processor, a temporarily equidistant activation and/or deactivation of each second electrochemical processor is guaranteed. In an example, time-dependent activation and/or deactivation of the plurality of the electrochemical processors can be achieved.

In an example, at least one resistive element is arranged between each of the first electrodes of the at least one second electrochemical processor and the external conductive pathway. The resistive elements can attribute to a decreased delamination or oxidation velocity of the first electrochemical processor compared to the second electrochemical processor, especially if the first and the second electrochemical processor are identical. The resistive element can be present in the first or the second electrochemical processor or both of them. Furthermore, the resistive element can be part of the conductive pathway.

In an example, each of the second electrochemical processors of the writing assembly comprises an electrical bypass, details of which will be described more detailed below.

In an example, each of the at least one second electrochemical processor comprises at least one electrical bypass, which electrically interconnects a contact point, which is arranged at the electrical interconnection of each of the at least one respective second electrochemical processor, with the second electrode (or, if present, the third electrode, the migration electrode or the subsystem) of the first electrochemical processor, thereby electrically connecting the external conductive pathway with the second electrode (or, if present, the third electrode, the migration electrode or the subsystem) of the first electrochemical processor.

According to this example, every electrochemical processor of the second type (second electrochemical processor) has its own electrical bypass which shorts every second electrochemical processor, as long as the contact point, wherein the bypass contacts, e.g. the second electrode of the first electrochemical processor, still is conducting, e.g. not yet oxidised or delaminated. If, however, the electrical bypass does not short the second electrochemical processor any longer (since e.g. the contact point of the bypass with the second electrode of the first electrochemical processor does not exist anymore because the contact point is oxidised), the second electrochemical processor is activated, a delamination or oxidation of the respective second electrode of the respective second electrochemical processor begins.

If, in a later point of time, the contact point of the second electrode of the second electrochemical processor ceases, due to the fact that also this contact point has been oxidized due to the progress in oxidation and delamination of the second electrode of the first electrochemical processor, the second electrochemical processor again is switched off.

In an example, if, with respect to the x-direction of the second electrode (or, if present, the third electrode, the migration electrode or the subsystem) of the first electrochemical processor, each of the electrical connections of the at least one electrical bypass is arranged before the respective electrical connection.

According to this example, the contact point of each bypass is arranged in a way that this contact point will be corroded before the contact point of the respective electrical connection of the respective second electrochemical processor, to which said bypass belongs, since the contact point of the bypass is aligned in a way that upon activation of the first electrochemical processor, it will be corroded at first.

In an example, the writing processor comprises at least two second electrochemical processors, wherein a first second electrochemical processor comprises at least one first electrical bypass, which electrically interconnects a contact point, which is arranged at the electrical interconnection of the first second electrochemical processor, with the second electrode (or, if present, the third electrode, the migration electrode or the subsystem) of the first electrochemical processor, thereby electrically connecting the external conductive pathway with the second electrode (or, if present, the third electrode, the migration electrode or the subsystem) of the first electrochemical processor; and the at least one further second electrochemical processor is electrically bypassed via at least one further electrical bypass which electrically interconnects a contact point, which is arranged at the electrical interconnection of the at least one further electrochemical processor, with a contact point, which is arranged at the electrical interconnection of the preceding second electrochemical processor with the second electrode (or, if present, the third electrode, the migration electrode or the subsystem) of the first electrochemical processor.

According to this example, only the first electrochemical processor in the category "second electrochemical processor" has a direct bypass, all subsequent second electrochemical processors are bypassed "indirectly", wherein the bypasses of all subsequent second electrochemical processors are connected to the electrical connection of the preceding second electrochemical processor and e.g. the second electrode of the first electrochemical processor. This example can guarantee that simultaneously with deactivation of the preceding second electrochemical processor (in x-direction), the subsequent electrochemical processor (in x-direction) is activated.

As already mentioned above, also for this example, it is advantageous, if the electrical interconnection with respect to the x-direction of the second electrode (or, if present, the third electrode, the migration electrode or the subsystem) of the first electrochemical processor, the electrical connection of the at least one electrical bypass is arranged before the respective electrical connection.

For the afore-mentioned examples which comprise a bypass, it is especially advantageous, if the contact point of the bypass, i.e. the beginning of the bypass, is aligned between the resistive element and the first electrode of the at least one second electrochemical processor.

According to an example, the at least one second electrochemical processor comprises a third electrode, wherein each of the at least one second electrochemical processor comprises at least one electrical bypass, which electrically interconnects the second electrode (or, if present, the third electrode, the migration electrode or the subsystem) of the first electrochemical processor with the second electrode of the respective second electrochemical processor.

According to this example, the writing processor can e.g. comprise first and second electrochemical processors, which are different. For example, the first electrochemical processor can comprise a first and a second electrode, whereas the second electrochemical processors can comprise three electrodes, a first, a second and a third electrode. In the afore-mentioned case, where this special second electrochemical processor comprises at least one electrical bypass, this bypass is arranged in a way that the second electrode of the second electrochemical processor is electrically connected with the second electrode of the first electrochemical processor.

Also here, it is advantageous that, with respect to the x-direction of the second electrode (or, if present, the third electrode, the migration electrode or the subsystem) of the first electrochemical processor, each of the electrical connections of the at least one electrical bypass is arranged before the respective electrical connection.

Furthermore, in one example, the writing assembly is embedded in a sheet or foil.

According to various aspects of the present patent application, example uses of the writing assembly are given. Especially, the writing processor can be used as time-dependent temperature recorder.

According to an example, the writing assembly can be built as indicator, such as a time indicator or a time-temperature-integrator. According to this example, a graphics layer comprising at least one image and/or a coloured signal can be aligned on at least a part of the second surface of the second electrode and/or the surface of the substrate opposite to the surface into which the electrodes are aligned. In the latter case, the substrate, the insulating material and the oxidized electrode are transparent in some examples.

Furthermore, example uses of the writing assembly as described above are provided. Special uses, among others, are use of the electrochemical processor as time indicator, time-temperature-integrator, part of package for food, sauces and/or beverages, drugs, pharmaceuticals, cosmetics and/or chemicals, such as containers, bottles, tetra pack cartons, or lids or screw caps for said containers.

In an example, an external switch, which is present at the afore-mentioned containers is actuated and the circuit of the processor is closed when said containers are first opened. This switch can be, e.g., a membrane switch or a sheet switch.

Furthermore, a method of composing, assembling or manufacturing an aforementioned electrochemical processor is described, wherein
a) a first electrode and a second electrode each having first and oppositely arranged second surfaces, wherein the first electrode and the second electrode have different electrode potentials and are separately aligned from each other in x-direction,
b) at least a part of a first surface of the first electrode and a part of the first surface of the second electrode is covered with an electrolyte in y-direction, wherein the electrolyte interconnects said first electrode with the second electrode, and
c) at least a part of the first surface of the second electrode which is uncovered by the electrolyte is covered with an electrically insulating material in y-direction which borders the electrolyte.

In an example method, a substrate is provided onto which the two electrodes are applied with their second surface.

Furthermore, the substrate can be supplied with an indicating layer, which can be an indicating layer or an image etc. This indicating layer can be applied on the same surface of the substrate, onto which the electrodes are applied; in this case, the indicating layer is applied before the electrodes are fixed on the substrate. In an alternative example, the indicating layer can also be applied to the outside surface of the substrate, i.e. the opposite surface of the substrate onto which the electrodes are applied. When the second electrode, e.g. an aluminium electrode, becomes oxidized, it becomes transparent and the underneath lying image becomes visible.

In the case that the electrodes are metal electrodes, these electrodes can be applied by metallization techniques, i.e. by evaporation of metals onto said substrate, e.g. evaporation of aluminium. Furthermore, sputtering techniques can also be used to apply the metal-electrodes onto the substrate. The starting point for manufacturing said processor can also be a half-finished product, such as a plastic film, i.e. a polyester-film, which is vaporized with e.g. aluminium. Such semi-finished products are known as packaging materials.

Furthermore, the vaporized electrode-layer can be structurized by laser ablation.

All further layers, compounds such as the covering layer, are spacing elements, the insulating material or the indication layers can be applied by mechanical methods such as printing methods, above all. Screen printing methods and/or flexo-print methods or by the use of dosing robots.

An example of producing a processor is given in the following:

A first electrode is made of graphite. This graphite layer is deposited on an Al-vaporized sheet. After deposition of the electrolyte, the Al-layer, lying beneath the graphite layer and in-between a graphite layer and the substrate is auto-oxidized to form $Al_2O_3$ and/or aluminium oxide hydroxide, which results in a stacked assembly, comprising a sheet (substrate), a layer of aluminium oxide or a aluminium oxide hydroxide, onto which graphite as first electrode is deposited.

BRIEF DESCRIPTION OF THE DRAWINGS

The present subject matter of the patent application will be described in greater detail in the following description together with the accompanying figures. However, these figures shall not be understood in a limiting sense to the general principle of present subject matter of the patent application.

FIG. 1 shows different prospective of a first example of an electrochemical processor for use in the writing assembly, said processor comprising a first electrode and a migration layer.

FIG. 2 shows a second example of an electrochemical processor for use in a writing assembly, additionally comprising a second electrode.

FIG. 3 shows another example of the electrochemical processor for use in the writing assembly.

FIG. 4 shows different perspectives of a further example of the electrochemical processor, comprising two reaction chambers.

FIG. 5 shows yet another example of the electrochemical processor for use in the writing assembly comprising two reaction chambers both filled with an electrolyte and/or a reactant.

FIG. 6 shows an electrochemical processor for use in the writing assembly with a swelling layer.

FIG. 7 shows an electrochemical processor for use in the writing assembly comprising swelling elements.

FIG. 8 shows an electrochemical processor for use in the writing assembly comprising two reaction chambers and three electrodes.

FIG. 9 shows an electrochemical processor for use in the writing assembly comprising three electrodes and a migration layer.

FIG. 10 shows an example of an electrochemical processor for use in the writing assembly with two electrodes and a migration layer.

FIG. 11 shows another example for use in the writing assembly according to which the electrochemical processor comprises three electrodes, wherein the second and the third electrode are bridged by a migration layer and third electrode comprises a covering layer.

FIG. 12 shows an alternative example according to which the electrochemical processor for use in the writing assembly comprises three electrodes, wherein the second and the third electrode are bridged by a migration layer and the third electrode comprises a covering layer or covering element.

FIG. 13 shows another example according to which the electrochemical processor for use in the writing assembly comprises a migration electrode, which is in direct electrical contact with the second electrode.

FIG. 14 shows another example of an electrochemical processor for use in the writing assembly.

FIG. 22 shows the concept underlying a two-dimensional electrochemical writing assembly.

DETAILED DESCRIPTION

Materials and Method of Manufacturing

Figure 1:
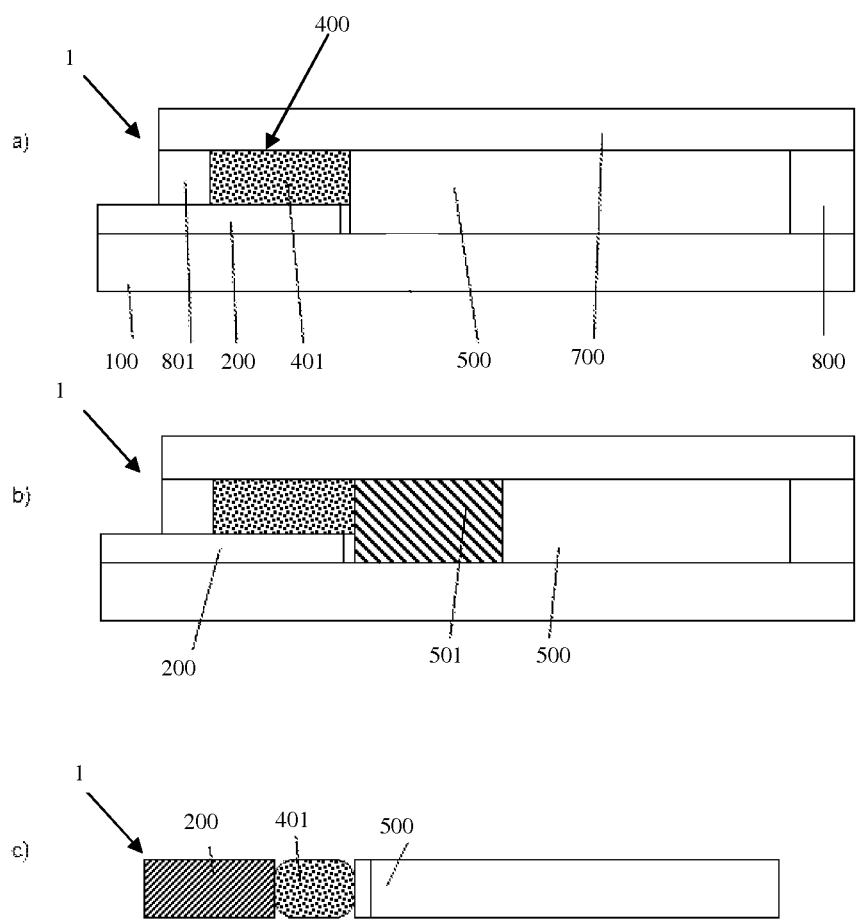
FIGS. 1 to 14 show different examples of electrochemical processors which are useful as first or second electrochemical processors in the writing assembly. In the following FIGS. 1 to 14, the respective indices, which indicate if the respective processor is depicted in the figures is used as first or second electrochemical processors (i.e. indices a or b, c, d, . . . , etc.) have been omitted since all processors can either be used as first or second electrochemical processor. For instance, if an electrochemical processor as depicted in the figures is to be used as first electrochemical processor in the assembly, index a has to be added to the respective numeral, or, if the respective electrochemical processor is to be used as the first of the electrochemical processor of the second type (second electrochemical processor), e.g. the index b has to be added to the respective numerals.

The substrate consists, e.g. of polyethylene film, polyester film, polypropylene film (PP) or PPC film (polypropylene coextruded), polyimide film or of any other material which for the present patent application aimed at has adequate mechanical, chemical and thermal stability as well as electric insulation properties. The film thickness can amount to some micrometers, however, some millimetres as well. A practically useful value is around, e.g., at 200 µm.

The electrodes consist e.g. of the following materials:
Graphite

The graphite layer can be produced, e.g., from the following material: acrylic resin and colloidal graphite in propanol, Graphit 33 of Kontaktchemie, CRC Industries Deutschland GmbH, Südring 9 DE-76473 Iffezheim.

Electrically Conducting "PEDOT" (3,4-polyethylenedioxythiophene)

The Bayer Company offers this polymer doped with polystyrene sulfonic acid which is added during the polymerization, as a suspension in water under the name Baytron P. This material is named PEDOT:PSS. [http://www.hcstarck.de/index.php?page_id=292&prod_service_id=310&anw_id=97&showlogin=no&suchstart=call: 5 Jan. 2010].

Electrically Conducting polyanilin

This is available, e.g. from Panipol Company (Finland) as PANIPOL T (polyanilin in toluene) [http://www.panipol.fi/call: 5 Jan. 2010].

However, all other electrically conducting polymers can also be used.

The deposition of the electrode layers made of electrically conducting polymers or graphite can be carried out, e.g. by means of a dosing robot, screen printing, flexographic printing, spraying, roller application, rotary coating, ink jet printing, film spreading method with different doctor blades or by means of any other appropriate method. Typical layer thicknesses are between 50 nm and 500 µm.

Electrodes made of thin aluminium films can be implemented by vapour deposition of aluminium onto plastic films. As an industrial primary product, e.g. polyester film having a vapour deposited aluminium film and an aluminium film thickness of <1 µm, e.g. 0.005 µm to 1 µm, from Nawrot Company can be used [http://www.nawrot.de/de/ueberblick.html].

Electrolyte Film

For example, aqueous solutions of $NaCl$, $CaCl_2$ or $LiClO_4$ in acetonitrile but also any other electrolyte can be used as electrolytes.

The electrolyte can be deposited as a gel-like layer. For this, e.g., an agarose gel can be used.

The deposition can be carried out, e.g. by means of a dosing robot, screen printing, flexographic printing, spraying, roller application, rotary coating, ink jet printing, film spreading method with different doctor blades or by means of any other appropriate method. Typical layer thicknesses are between some µm to 1 cm in some examples, and at some 10 µm to some 100 µm in some examples.

Encapsulation Layer

The encapsulation layer consists, e.g. of polyethylene, polyester, acrylic resin based lacquer, acrylate copolymer, urethane enamel. However, any other materials can also be used which have adequate adhesive and encapsulation properties.

The deposition of the encapsulation layer can be carried out, e.g. by means of a dosing robot, screen printing, flexographic printing, spraying, roller application, rotary coating, ink jet printing or by means of any other appropriate method.

Typical layer thicknesses are between some µm to 1 cm, preferably at some 10 µm to some 100 µm.

It is possible to deposit the layer in the heat laminating method as well.

Electrically Insulating Material and Spacer Elements

These consist of, e.g., acrylic resin based lacquer, acrylate copolymer, urethane enamel. However, any other materials can also be used which have adequate adhesive properties.

The deposition of the electrically insulating material and/or the spacers can be carried out, e.g., by means of a dosing robot, screen printing, flexographic printing or laminating methods. Typical layer thicknesses are between some µm to 1 mm in some examples, at some 10 µm to some 100 µm in some examples.

It is possible to deposit these compounds as layers or as a film, for example made of polyester or polyethylene, e.g. by the heat laminating method.

Migration Layer

Varying migration layers and methods for manufacturing thereof have already been disclosed in the patent application PCT/EP2008/064712. As far as the possible compounds or materials for this layer are concerned, explicit reference is made to this patent application. Especially, the migration layer can comprise or be composed of cellulose or impregnated, e.g. impregnated with silicon oil, cellulose.

Example for Manufacturing a Migration Layer with Polyvinyl Alcohol PVAL:

0.2 g $CaCl_2$ 6 $H_2O$ is dissolved in 10 ml of deionized water and 0.6 g of polyvinyl alcohol (PVAL) is added to this electrolyte and which is stirred at 80° C. for about two hours. After cooling, 0.35 g isopropanol is added under stirring. The deposition can be carried out, e.g. by means of a dosing robot, screen printing, flexographic printing or any other printing method or film spreading method. Typical layer thicknesses are between some μm to 1 mm in some examples, at some μm to some 100 μm in some examples.

After depositing the polyvinyl alcohol layer is dried.

Swelling Layer and Swelling Elements

These are able to consist, e.g. of polyvinyl alcohol or any other material which increases its volume during the absorption of water and an electrolyte, respectively. This deposition can be carried out, for example by means of a dosing robot, screen printing, flexographic printing, spraying, roller application, rotary coating or any other printing method. Typical layer thicknesses are between some μm to 1 mm in some examples, at some μm to some 100 μm in some examples. After depositing the polyvinyl alcohol layer is dried.

Applications

The two-dimensional writing assembly according to the present patent application can display or record physical parameters as functions of time. A special parameter is for example the temperature. Especially the two-dimensional writing assembly according to present patent application can enable the recording of the course of temperature with time.

The electrochemical processor is able to be employed, e.g. in the micro reaction engineering for such applications in which at a predetermined time a reactant is to be brought into contact with an electrolyte in order to set off a chemical and/or electrochemical reaction. Here, it concerns with a great and new field of application.

However, the subject matter of the present patent application can also be used as a time indicator or as a temperature-time integrator. These are allowed to be parts of product packages—particularly food packages. Time indicators can be started, e.g. when opening a package by establishing an electric short-circuit between the two layers of the electrochemical processor. Time indicators thus indicate the lapse of time after opening the package.

Also, temperature-time integrators can be started in this way. They can be used as an electronic best-before date. Such an application is known from the earlier patent application PCT/EP2008/064712. Having the electrochemical processor, it additionally results the possibility of electric activation of the system (e.g. with opening the package). They can be combined with each other into one product.

FIG. 1 shows different perspective views of a first example of an electrochemical processor 1 which can be used in a writing assembly. On a substrate 100 a first reaction chamber 400 and a first electrode 200 (starting electrode) are located. The first reaction chamber 400 is filled with an electrolyte 401. A migration layer 500 is in physical contact with the first reaction chamber 400 comprising the electrolyte 401. The electrochemical processor 1 is limited by spacers 800 and 801 in x-direction. These spacers 800, 801 interconnect the first electrodes 200 or the substrate 100, respectively, with the encapsulation layer 700 and thus determine the thickness or size of the processor 1 in y-direction.

The first electrode 200 and the migration layer 500 are located next to each other in x-direction.

In FIG. 1a, the first electrode 200, e.g., consists of graphite and the migration layer 500 consists of cellulose. Upon activation of the processor 1, which can be achieved by e.g. filling in the electrolyte 401, the electrolyte 401 migrates due to capillary forces into the migration layer 500 (see reference numeral 501 in FIG. 1b) which depicts the part of the migration layer 500 already soaked with the electrolyte.

The filling in of the electrolyte can for example be achieved that one of the wall members define the first reaction chamber for the electrolyte 401 (or also the second reaction chamber 600 as in the following examples) comprises an opening (not shown), which allows a mass exchange with the surrounding envi-environment of the processor 1. This opening can for example be located in the encapsulation layer 700, the wall member 801 or the respective wall members in z-direction (not shown). In this case, the reaction chamber is filled with a substance, which is able to absorb water vapour from the surrounding environment, e.g. polyvinyl alcohol or polyvinyl alcohol with a hygroscopic additive, e.g. hygroscopic salts, such as for example calcium chloride. If this hygroscopic substance is in contact with water vapour via the above mentioned opening, it absorbs water and an electrolyte 401 is formed inside the first reaction chamber. Of course this principle can also be applied to the following example as well as the second reaction chamber 600.

FIG. 1c is a simplified top view of FIG. 1a and FIG. 1b. In FIG. 1c, for reasons of clarity, all parts of the electrochemical processor 1, except the first electrode 200, the electrolyte 401 and the migration layer 500 are omitted for reasons of clarity.

The electrochemical processor as depicted in FIG. 1 is especially useful as first electrochemical processor, i.e. as time-line processor.

Figure 2:
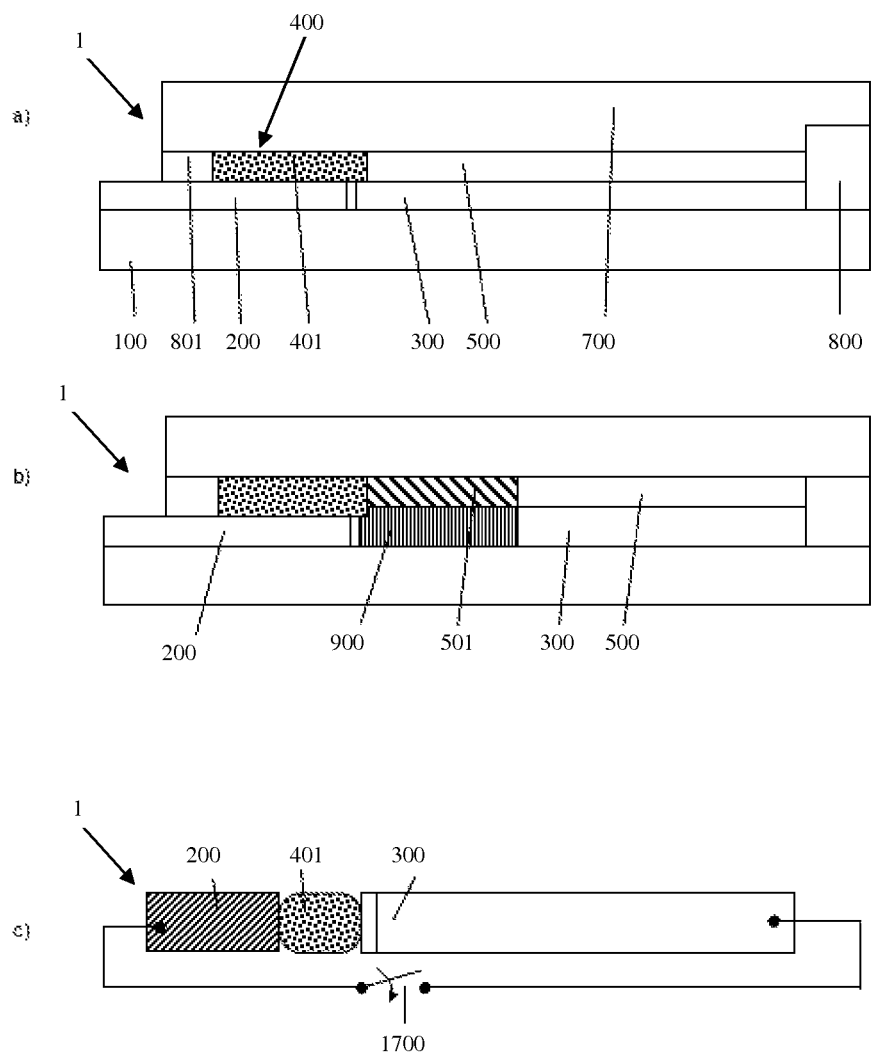

FIG. 2 shows another example of an electrochemical processor 1, which can be used in the writing assembly. In addition to the electrochemical processor 1 as depicted in FIG. 1, an additional electrode 300 is present next to the migration layer 500, the migration layer 500 again being formed by a material with capillary effect, such as for example cellulose.

The second electrode 300 (delamination electrode) is in electric connection with the first reaction chamber 400, comprising the electrolyte 401. The second electrode 300 and the migration layer 500 are fixed to each other or laminated above each other. Where the second electrode 300 is in contact with the migration layer 500, upon activation of the electrochemical processor 1, i.e. the migration of the electrolyte 401 into the migration layer 500 (see reference numeral 501 in FIG. 2b, which represents the part of the migration layer 500, into which the electrolyte 401 has yet migrated) guarantees a contact of the electrolyte 401 with the second electrode 300 from above, i.e. in y-direction. Due to the fact that both electrodes 200 and 300 are made of different materials, they have different electrochemical potentials. Upon short-circuiting the processor 1 by closing an external electrical switch 1700, the processor is activated. Alternatively or in addition for example an external voltage can be applied to the first electrode 200 and the second electrode 300 attributing to or establishing different electric potential of the first electrode 200 and the second electrode 300.

The first electrode 200 and the second electrode 300 are located next to each other in x-direction and consist of different materials or same materials and form an electrochemical cell in combination with the electrolyte 401 and/or the external voltage supply or switch 1700 by establishing an electric short circuit between the first electrode and the second electrode 300 by, e.g., closing the external switch 1700.

An electrochemical reaction on a second electrode 300 causes for example an oxidation of the second electrode 300 (this is for example the case when a second electrode is formed of aluminium or titanium etc.), therefore changing its conductivity and/or its transparency. The change in transparency can be used as indicator.

Upon activation of the processor 1, the electrolyte 401 migrates into the migration layer 500 and the second electrode 300 oxidizes (oxidized part of the second electrode: reference numeral 900).

The migration layer 500, which is able to soak up the electrolyte 401 has the effect that a larger volume of the electrolyte is present in the space between the encapsulation layer 700 and the second electrode 300.

The electrochemical processor 1 as depicted in FIG. 2 is especially useful as first electrochemical processor in the writing assembly, i.e. as time-line processor.

FIG. 3a shows another example of the processor which can be used in a writing. The processor especially can be used as second processor (column processor) although it also can be used as first processor (time-line processor). On a substrate 100 a first reaction chamber 400 having a first electrode 200 (starting electrode) is located. The first reaction chamber 400 is filled with an electrolyte 401. A second electrode 300 (delamination electrode) is in electric connection with the first reaction chamber 400. The second electrode 300 and the insulating material in form of an insulating composite coating 500 are fixed to each other. Where the second electrode 300 is in contact with the composite coating 500, electrolyte contact with the second electrode 300 is prevented. The electrochemical processor 1 is limited by spacers 800 and 801 in x-direction. These spacers 800, 801 interconnect the first electrode 200 or the substrate 100, respectively, with the encapsulation layer 700 and thus determine the thickness or size of the processor 1 in y-direction.

The first 200 and the second electrode 300 are located next to each other in x-direction and consist of different materials and forming an electrochemical cell in combination with an electrolyte 401. By establishing an electric short circuit between the first 200 and the second electrode 300 via e.g. an external switch, which is aligned outside the processor 1 (not shown) electrochemical processes can be set off on the electrodes, especially on the second electrode 300.

An electrochemical reaction on the second electrode 300 causes a separation of the material compound between the composite coating and the second electrode 300 thus forming a nanometric interlayer, which will be discussed in detail later on.

In FIG. 3a, the first electrode 200, e.g. consists of graphite and the electrode 300 consists of a thin aluminium film having a thickness of some 10 nm. Alternatively, both electrodes 200 and 300 can be made of the same material, such as aluminium. Upon activation of the processor 1, the electrolyte 401 migrates because of the separation of the material compound between the second electrode 300 and the composite coating 500 in the developing aluminium oxide film (not shown) and the interlayer to the composite coating 500 as explained in the following examples. Since the electrode 300 is laterally converted into alu-aluminium oxide and/or aluminium oxide-hydroxide, this electrode can also be used as an optical display element.

The first reaction chamber 400 is bounded by the spacer 801 and the insulating composite material 500 in x-direction, as well as by the first electrode 200 and the encapsulation layer 700 in y-direction. Of course, the first reaction chamber 400 is also bounded by respective wall members in z-direction, however, these elements are not shown in the cross-section as shown in FIG. 3a.

In another example of the processor 1, the possibility is also given, that one of the wall members defining the first reaction chamber 400 (or also the second reaction chamber 600 as in the following examples) comprises an opening (not shown) which allows a mass exchange with the surrounding environment of the processor 1. This opening can e.g. be located in the encapsulation layer 700, the wall member 801, or the respective wall members in z-direction. In this case, the reaction chamber 400 is filled with a substance, which is able to absorb water vapor from the surrounding environment, e.g. polyvinyl alcohol, or polyvinyl alcohol with a hygroscopic additive, e.g. hygroscopic salts, such as e.g. calcium chloride. If this hygroscopic substance is in contact with water vapour via the above-mentioned opening, it absorbs water and an electrolyte 401 is formed inside the first reaction chamber 400. Of course, this principle can also be applied to the following examples as well as the second reaction chamber 600.

FIG. 3b is a simplified top-view of FIG. 3a. In FIG. 3b, for reasons of clarity, all parts of the electrochemical processor 1, except the first electrode 200, the electrolyte 401 and the second electrode 300 are omitted for reasons of clarity.

As illustrated in FIG. 3c, an external conductive pathway 2100, which comprises an electrochemical switch 1700, completes the electrical circuit between the first electrode 200 and the second electrode 300. In one example, the first electrode 200 is made of a material with a different electrode potential compared with the material of the second electrode 300. Therefore, upon completion of the external conductive pathway 2100 by closing the switch 1700, a local galvanic element is formed; due to the fact that the electrode potential of the second electrode 200 is lower than the electrochemical potential of the first electrode 200, an oxidation or delamination of the second electrode 300 begins from the side where the second electrode 300 contacts the electrolyte 401.

According to the example displayed in FIG. 3d, an additional voltage source 1800, such as an additional galvanic element or a battery, can be integrated in the external conductive pathway 2100. The voltage source 1800 especially is helpful, if the first electrode 200 and the second electrode 300 have the same electrochemical potential, e.g. because they are made of the same material, such as aluminium.

FIG. 3e displays the progressing oxidation of the second electrode 300. The second electrode 300 delaminates from the insulating material 500, forming a gap between the surface of the electrode 300 and the insulating material 500. Therefore, the electrolyte 401 can intrude into this gap and wets the first surface of the second electrode 300. During this oxidation, the second electrode 300 is oxidised, forming an oxidic layer 900, e.g. in case of aluminium, aluminium oxide, aluminium hydroxide or mixtures thereof.

Figure 3:
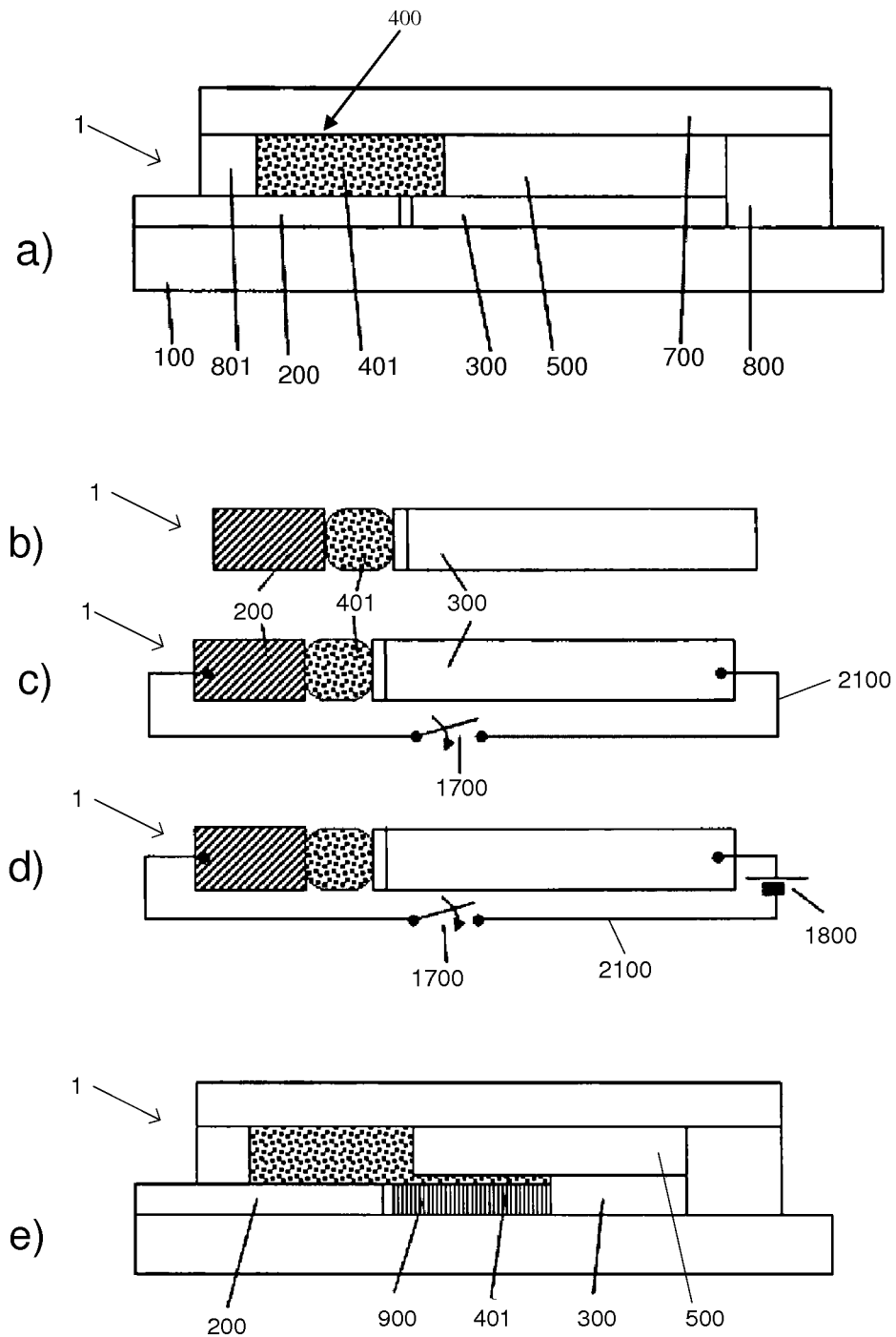

Especially the electrochemical processor as depicted in FIG. 3 can be used as second electrochemical processor in the writing assembly, i.e. as column processor.

FIG. 4a shows a sectional view of a further example of an electrochemical processor which can be used in a writing assembly, which comprises a substrate 100 having a first electrode (starting electrode) 200, a second electrode (delamination electrode) 300, an electrolyte 401 in a first reaction chamber 400, a second reaction chamber 600, spacer elements 800, 801 as well as an cover layer 700. In FIG. 4b a top view is shown.

The electrolyte 401 in the first reaction chamber 400 is in contact with the first electrode 200 and parts of the second electrode 300 (the first surfaces of these electrodes).

The first electrode 200 consists, e.g. of PEDOT: PSS, and the second electrode 300 consists of a thin aluminium film. Both electrodes can be short-circuited externally, e.g., where they lie exposed on the left edge (FIGS. 4a and 4b). This results in an electrochemical oxidation of the thin aluminium film 300 in the short-circuited electrochemical cell 1 due to the different electrode potentials. Oxidation is starting where aluminium 300 is in contact with the electrolyte 401. Aluminium 300 is converted into aluminium oxide 900.

Then, on the left edge of the composite coating 500, the solid layer contact between the composite coating and the aluminium of the second electrode 300 becomes loose because the aluminium oxide 900 generated on electrochemical way develops a nanometric interlayer between the aluminium film 300 and the composite coating 500.

This process continues laterally below the composite coating 500, and the aluminium oxide 900 reaches the second reaction chamber 600. As shown in FIG. 4c, it is possible for the second electrode 300 on its surface to be converted into aluminium oxide 900. However, it is also possible in use of very thin aluminium films (e.g. some 10 nm) to oxidize the entire electrode layer up to the substrate 100 (FIG. 2d). Because of the laterally spreading aluminium oxide film 900, also a thin electrolyte film 401 migrates up to the second reaction chamber 600. If there is a reactant in the second reaction chamber 600, a chemical reaction due to the contact with the electrolyte 401 can take place.

Figure 4:
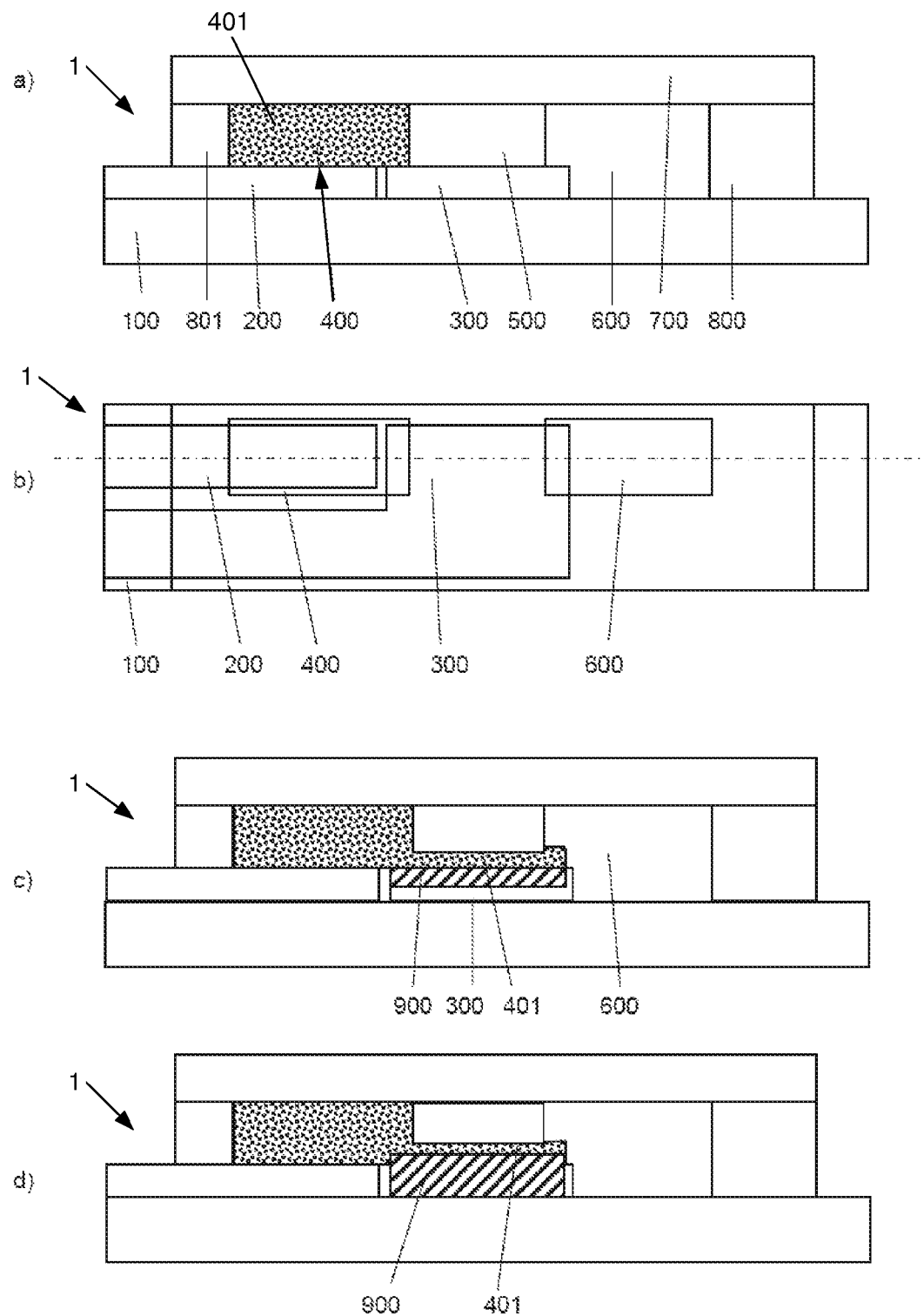
Figure 5:
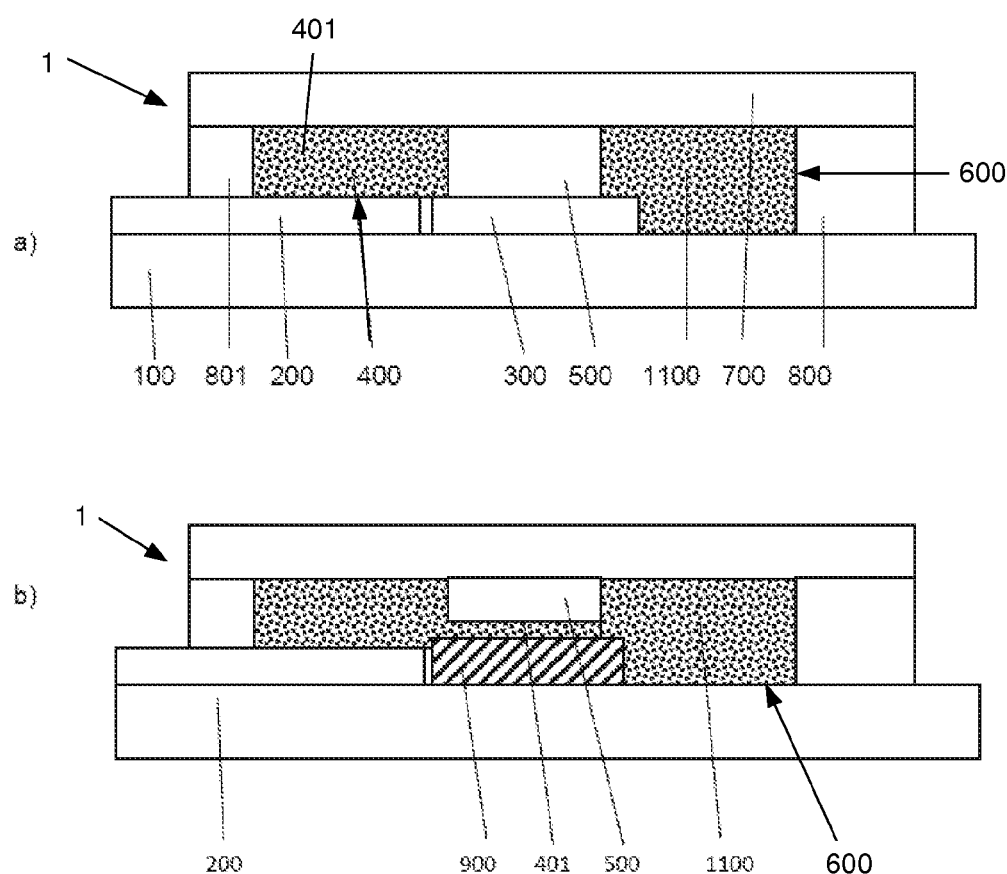

In FIG. 5, there is shown a system according to FIG. 4 in which a reactant 1100 takes up the space of the second reaction chamber 600. FIG. 5a shows the system before, FIG. 5b after the chemical oxidation of the second electrode 300.

Because of the aluminium oxide film 900 spreading laterally, also herein a thin electrolyte film 401 migrates from left to the right until a contact occurs with the reactant 1100 in the second reaction chamber 600. Because of the occurring contact of the material a chemical reaction can be set off. Such an application can be employed, e.g. in the micro reaction engineering.

Figure 6:
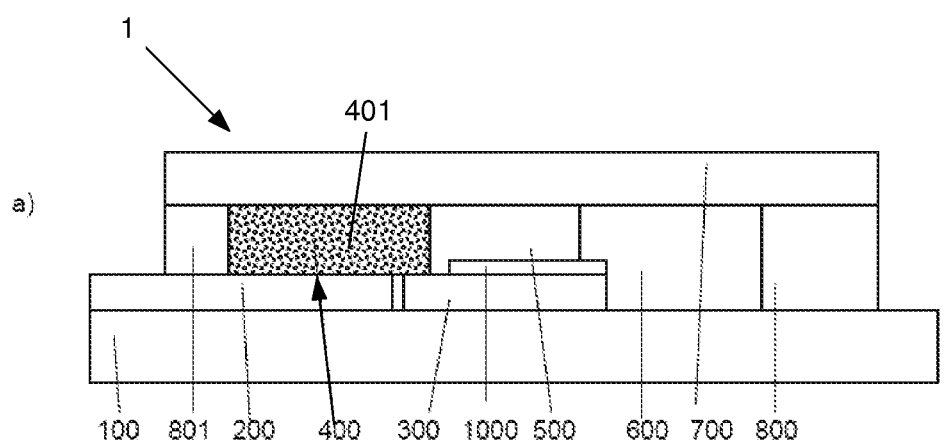
Figure 6:
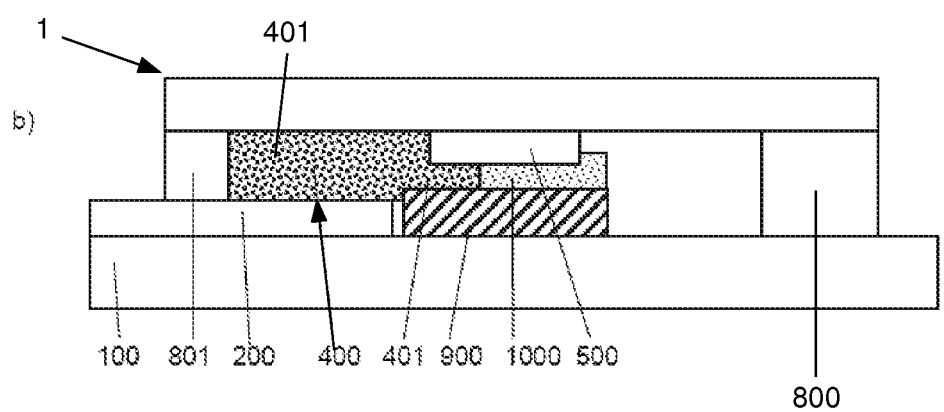

The film thickness of the electrolyte film 401 between the aluminium oxide film 900 and the composite coating 500 can be increased in that between the composite coating 500 and second electrode 300 a swelling layer 1000, e.g., made of polyvinyl alcohol (PVAL) is inserted (FIG. 6a). This swelling layer is able to assimilate the electrolyte and because of that to swell. As shown in the example according to FIG. 6b, here an aluminium oxide film also spreads laterally because of the separation of the material compound between the aluminium of the second electrode 300 and the compound layer 500. It drags an electrolyte film 401 behind. During contact between the electrolyte and swelling layer 1000 the latter is swelling in its thickness and forming a greater channel cross section for the electrolyte 401. (The film thickness ratios are not shown to scale in the figure. For the sake of simplification of the illustration herein the increase of the film thickness of the swelling layer 1000 is at the expense of the composite coating 500. This is not the case in fact, but the total film thickness of the system is changing).

Figure 7:
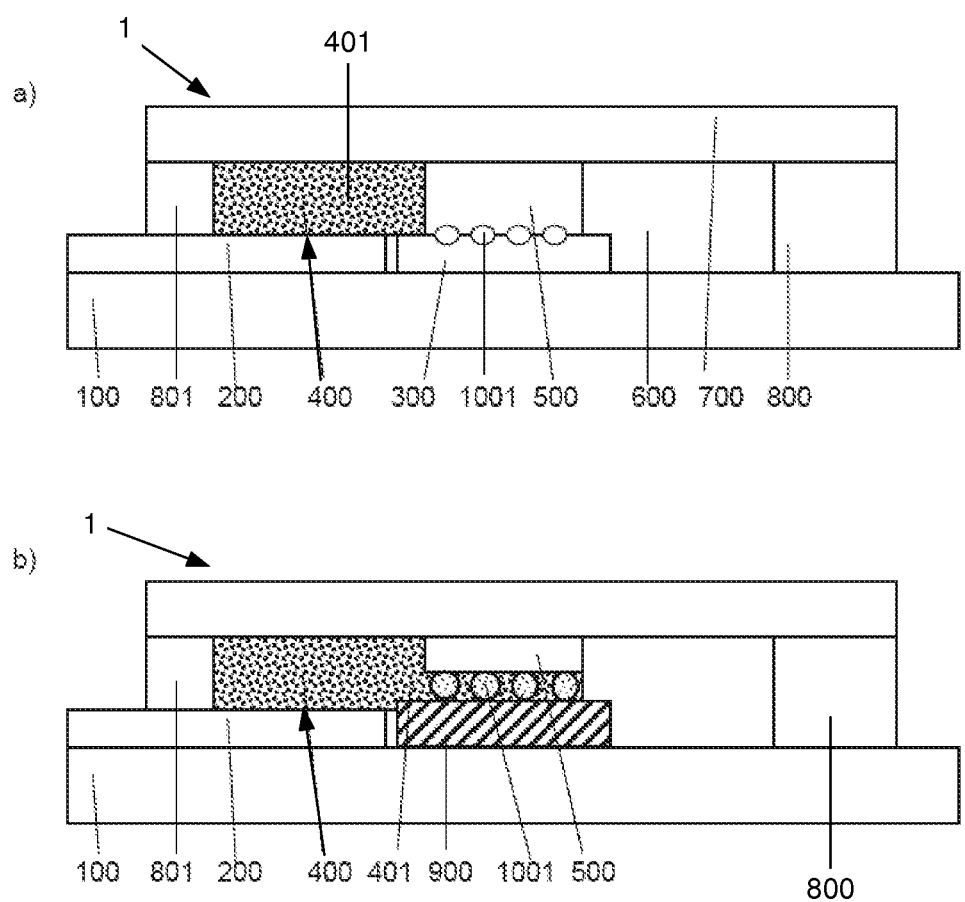

However, instead of the swelling layer 1000 swelling elements 1001 can also be used (FIG. 7). These swelling elements 1001 are arranged between the composite coating 500 and the second electrode 300. They may be formed in an island pattern or else as strips (in parallel or transversely to the migration direction of the electrolyte 401). For the sake of simplification, swelling layers and swelling elements are not shown in the following examples. They can similarly be used in the preceding or following examples.

Figure 8:
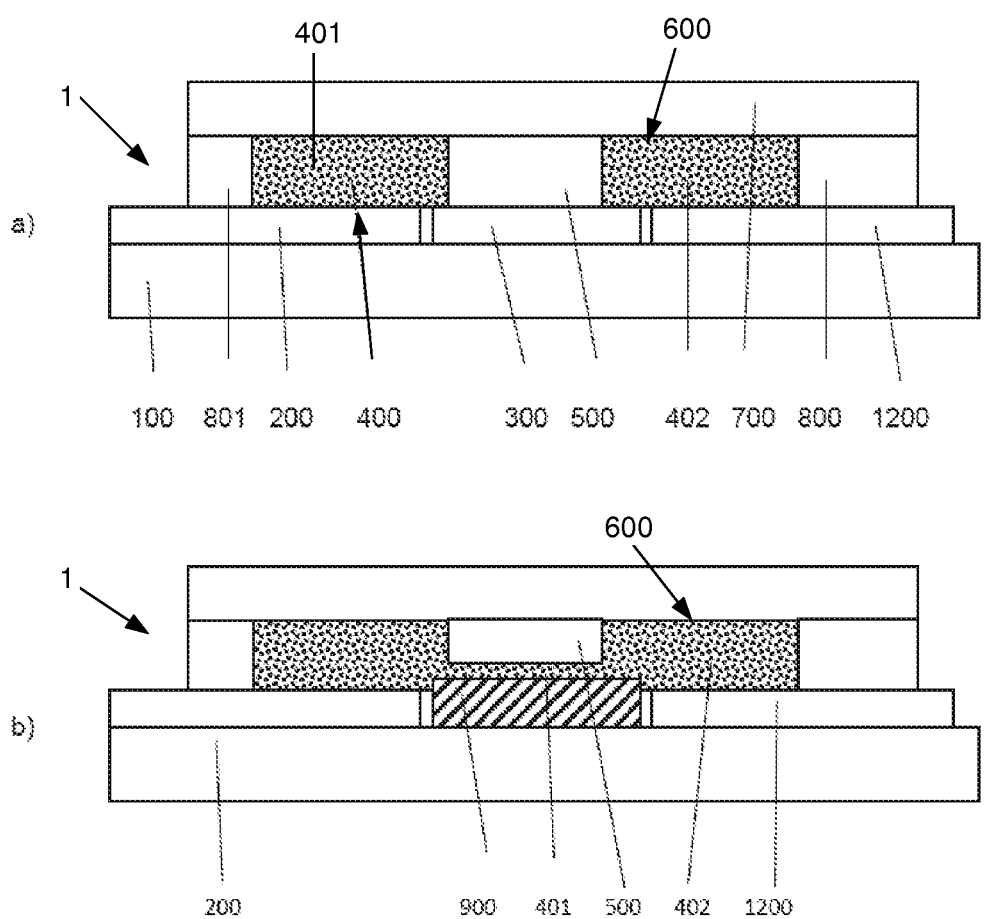

In FIG. 8a, a system is shown, which comprises a third electrode 1200, being aligned next to the second electrode 300. Here, an electrolyte 402 takes up the space of the second reaction chamber 600. Additionally, the third electrode 1200 contacts the electrolyte 402 in the second reaction chamber. When the material compound between the second electrode 300 and compound layer 500 is loosened as illustrated in the preceding examples also an electrolyte channel 401 (FIG. 8b) is formed. Because of that an electrochemical cell is formed with the third electrode 1200. After formation of the electrolyte channel 401, for ex-example, an electrochemical reaction on the third electrode can be set off between the first electrode 200 and the third electrode 1200 when the first and the third electrodes are electrically connected. This third electrode can be made of an electrochromous material, for example, PEDOT:PSS, PANI:DBSA or another. When the first and the third electrodes consist of different materials and these being short-circuited then electrochemical effect is caused on the third electrode according to the potential difference between the first and third electrodes.

The third electrode 1200 may similarly consist of a thin aluminium film. When the third electrode 1200 is connected with the first electrode 200 (for example made of PEDOT: PSS) so electrochemical oxidation of the electrode 1200 arises after the development of the electrolyte channel 401 which electrode is converted that way into aluminium oxide and so will be transparent where the aluminium previously was in contact with the electrolyte. In this manner, the third electrode 1200 can be used as an optical display element.

In FIG. 9a an arrangement with a third electrode 1200 as well as an additional migration layer 1300 is shown. Migration layer systems are known from the patent application PCT/EP2008/064712. The whole inventive contents disclosed there is to be included with into the patent application prepared herein. In the present example the first electrode 200 consists of PEDOT:PSS, the second electrode 300 and the third electrode 1200 consist of a thin aluminium film having a film thickness of some 10 nm. The migration layer 1300, for example, consists of polyvinyl alcohol and is in contact with the second electrode 300 and the third electrode 1200. The second electrode 300 and the third electrode 1200 are electrically connected with the first electrode 200.

When the electrolyte channel 401 is created as shown in the preceding example then the electrolyte 401 is in contact with the migration layer 1300 (FIG. 9b). The polyvinyl alcohol layer is able to absorb the electrolyte on this contact area. The migration of the electrolyte occurs laterally as illustrated in PCT/EP2008/064712 in detail. The migration speed and the temperature dependence of the migration speed can be adjusted by the thickness, type and composition of the migration layer during the fabrication. In FIG. 9c the migration of the electrolyte in the migration layer 1300 was proceeding and the subjacent electrode 1200 is electrochemically oxidized where it is in contact with the electrolyte (a part of the electrode 1200 becomes to 1201). Forward moving the migration front 1302 in the migration layer 1300 in this way causes an oxidation front 1202 to proceed in the aluminium film 1200 which is converted into aluminium oxide 1201 up to this oxidation front and becomes transparent this way. Here, the third electrode 1200 can also be used as an optical display element in a time indicator or temperature-time integrator. Thus, the processor enables a time-dependent display or recording of the temperature ($T=F(t)$).

Figure 9:
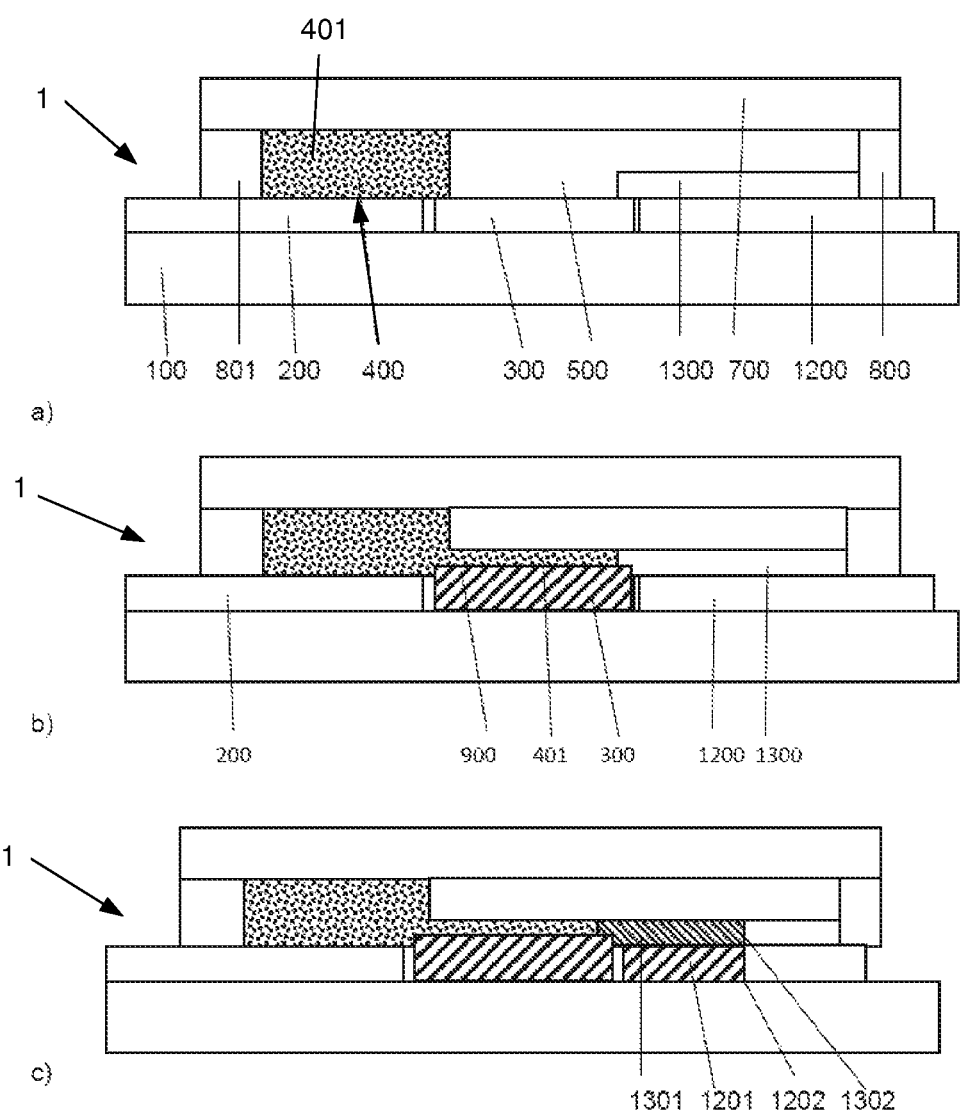
Figure 10:
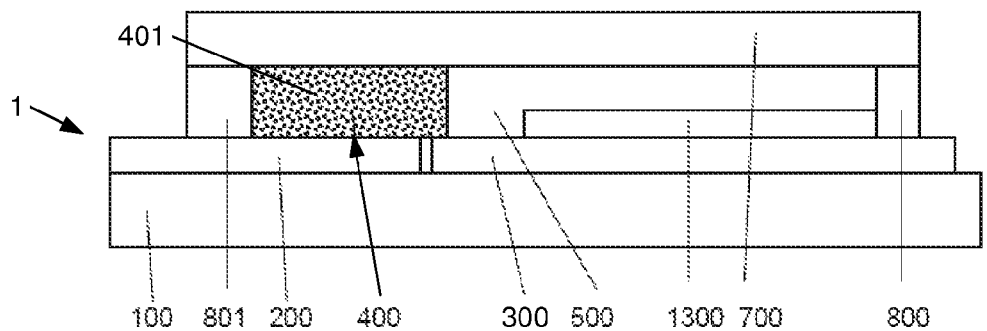

In an alternative example, the electrodes 300 and 1200 from FIG. 9a are combined into a through electrode 300 (FIG. 10). The function of this arrangement follows in the same way as shown in the example according to FIG. 9a.

Alternatively, in the example according to FIGS. 9 and 10, the first electrode 200 can, e.g. also consist of graphite.

Figure 11:
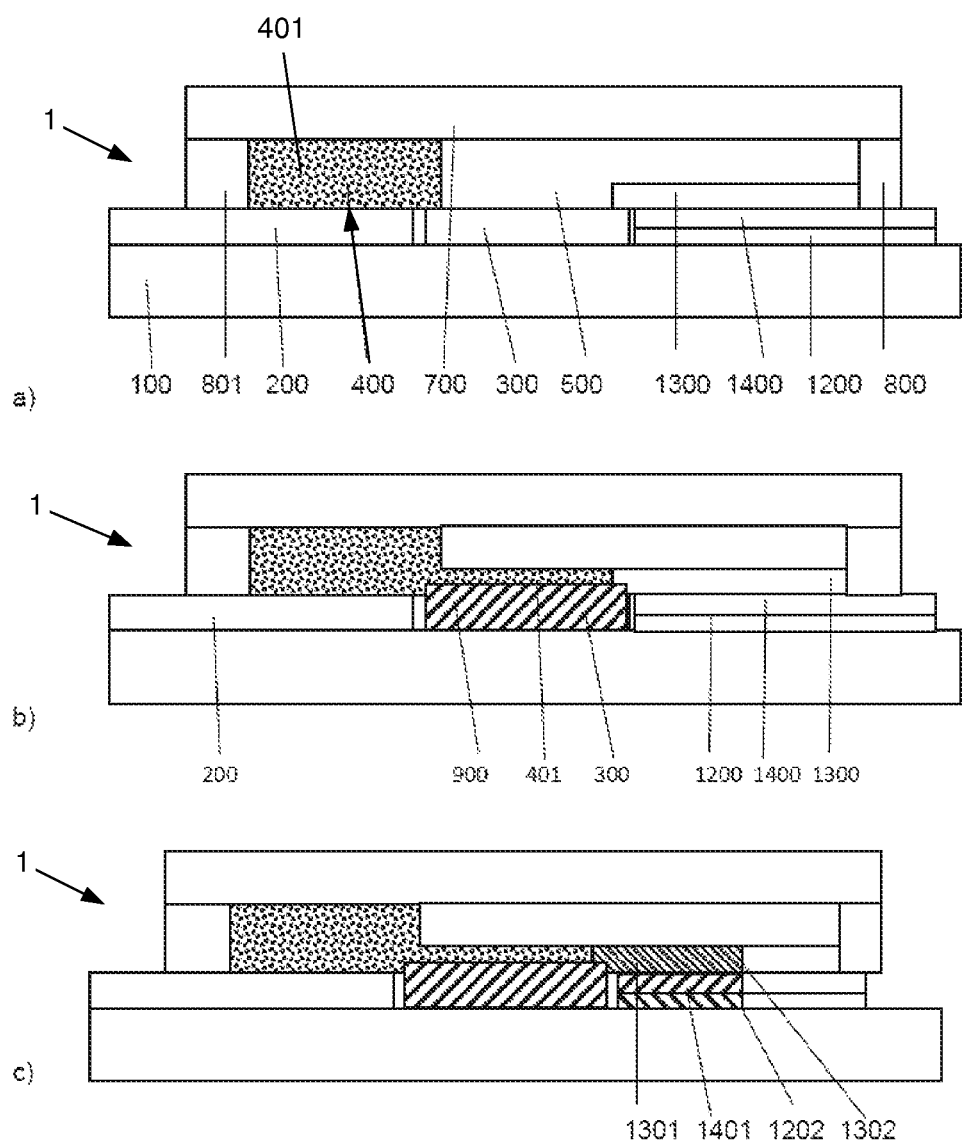

FIG. 11 shows an example with a first electrode 200 made of graphite, a second electrode 300 made of aluminium as well as a third electrode 1200 made of aluminium. The aluminium film of the third electrode is combined with an electrode coating film 1400 made of graphite. (The graphite film of the first electrode 200 and electrode coating film 1400 may also have the same film thickness and can thus be generated in the same manufacturing process. In FIG. 11 different film thicknesses are illustrated.

When the electrolyte channel 401 is made as shown in the preceding examples then the electrolyte 401 being in contact with the migration layer 1300 (FIG. 11b). This migration layer 1300, e.g. a polyvinyl alcohol layer, is able to absorb the electrolyte on this contact area. The migration of the electrolyte 401 occurs laterally as illustrated in the preceding examples. The electrolyte 401 migrates in the migration layer 1300 up to the migration front 1302. (The migration layer permeated with electrolyte has the reference numeral 1301). Then, the electrolyte is in contact with the subjacent electrode coating film 1400 made of graphite and through this with the aluminium film of the third electrode 1200 as well. Between the aluminium and the graphite, the development of local electrochemical cells takes place. The electrochemical cells are forming, on the one hand, between the aluminium film and graphite particles with the intermediate electrolyte, and on the other hand, the graphite particles are in electrical contact with aluminium. Due to different electrode potentials of aluminium and graphite this results in the electrochemical oxidation of the aluminium film up to the oxidation front 1202 which is determined by the migration front 1302 of the electrolyte. Since aluminium is converted into aluminium oxide then, when the arrangement is viewed from below, reflecting metal layer is no longer visible but a black graphite layer. Here, the third electrode 1200 having the electrode coating layer as optical display element can also be used in a time indicator or temperature-time integrator. In this or in the further examples the electrode coating layer 1400 may also consist of other materials. For example, this can be polyaniline. Thus, the processor enables a time-dependent display or recording of the temperature (T=F(t)).

Figure 12:
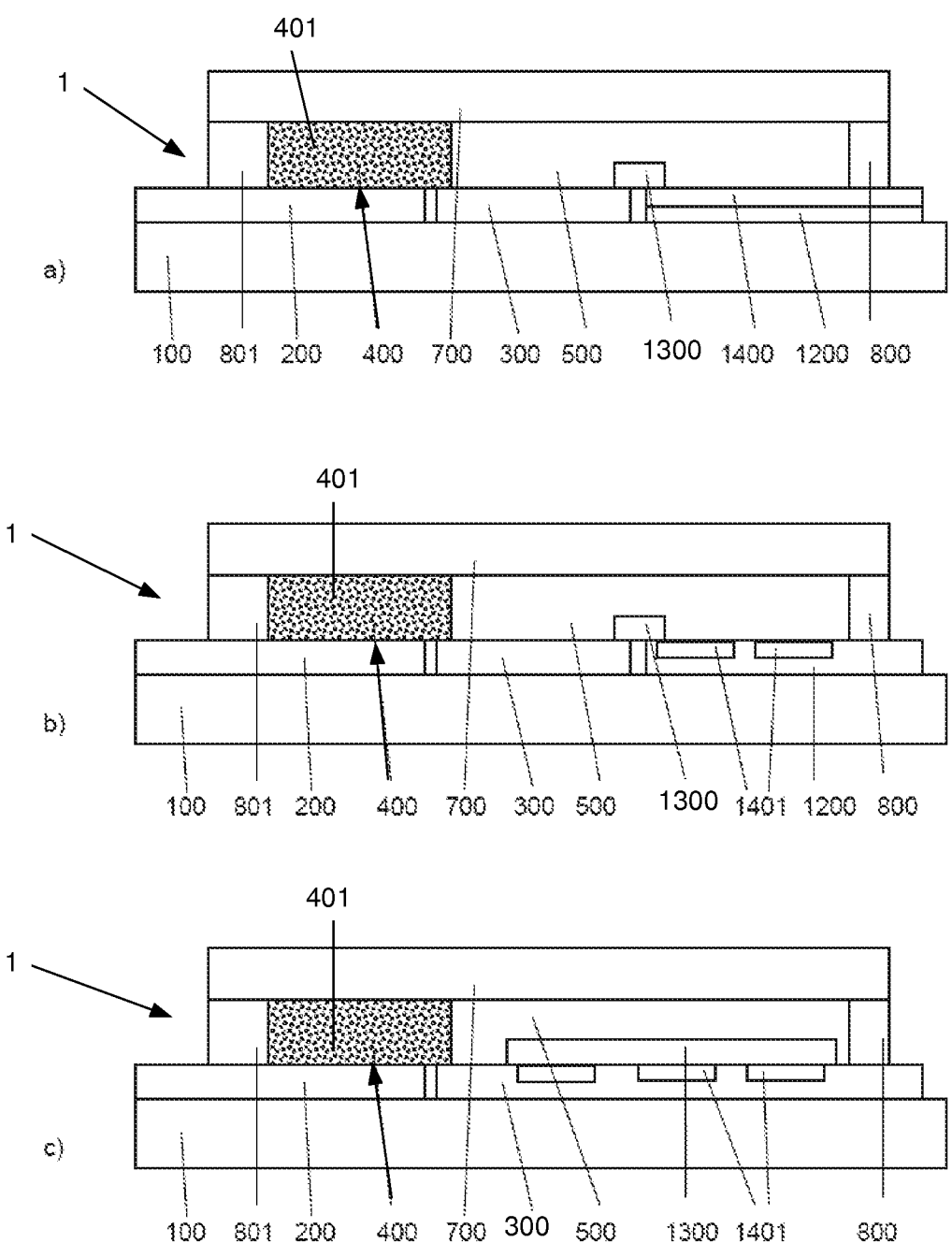

In an example according to FIG. 12a the example from FIG. 9 is modified in that the migration layer 1300 is shorter, and in that the entire third electrode 1200 and the electrode coating layer 1400 are not covered. When the electrolyte is penetrated into the migration layer 1300 as illustrated above then it is in contact with the left end of the electrode coating layer 1400 as well as with the subjacent third electrode 1200. Also without the migration layer 1300, here the electrolyte is able to migrate in the graphite of the electrode coating layer 1400 as well as the aluminium oxide of the third electrode 1200 developed by means of electrochemical oxidation and between these layers, respectively. Also this effect can be used as optical display element in a time indicator or a temperature-time integrator. Thus, the processor enables a time-dependent display or recording of the temperature (T=F(t)).

In FIG. 12b, the arrangement from FIG. 12b is modified such that the electrode coating layer 140 is separated into elements 1401 which are embedded in the third electrode 1200, i.e. they do not completely cover the entire third electrode 1200 but are deposited in a structured manner. As a result, island structures or strip structures can be implemented which run in parallel or transversely to the migration direction (in the Figure from left to the right). Also, between the surfaces covered with graphite of the aluminium film of the third electrode 1200 the oxidation of aluminium continues since local electrochemical elements here are also effective in combination with the graphite layer. While the parts of the aluminium film covered with an electrode coating layer 1401 become black when viewed from below, however, the parts of the aluminium film being not covered become transparent. Also, this effect can be used as an optical display element in a time indicator or temperature-time integrator.

FIG. 12c shows an arrangement in which the second electrode and the third electrode are combined into a single electrode 300. This electrode again consists of aluminium and being covered with an electrode coating layer 1401 on some surface elements. Between the composite coating 500 and electrode 301 having the electrode coating layer 1401 a migration layer 1300 is located. The system is activated in that the electrode 300 is short-circuited with the first electrode 200 on its outer contacts. Because of that the material compound between the composite coating 500 and the aluminium of the electrode 300 is separating as illustrated above. Then, the electrolyte enters into the migration layer 1300 which there is an oxidation of the aluminium film of the electrode 300 with a proceeding oxidation front.

Figure 13:
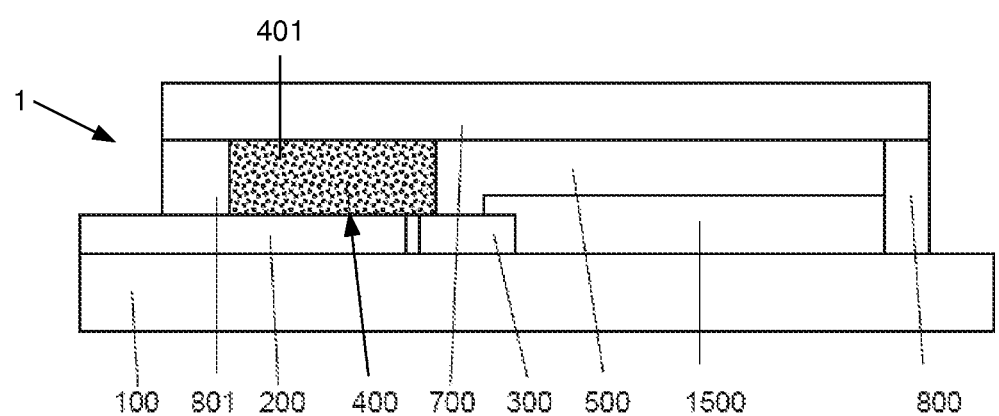

FIG. 13 illustrates an example having a first electrode 200 and a second electrode 300. The second electrode 300 is in contact with a migration electrode 1500. Such a migration electrode is formed by the fusion of the functions of an electrically conducting polymer layer (for example polyanilin) and a migration layer (for example polyvinyl alcohol). Then it concerns with, e.g. a "polymer-polymer composite" made of polyanilin and polyvinyl alcohol. When the electrolyte enters from the first reaction chamber 400 into the migration electrode 1500 after the separation of the material compound between the second electrode and the compound layer 500, then the electrolyte migrates in this migration electrode like in a migration layer. When the migration electrode 1500 is electrically connected with the first electrode 200, so in the migration electrode there are electrochemical reaction and an electrochromous effect which depends on the potential difference between the first electrode and the migration electrode.

Figure 14:
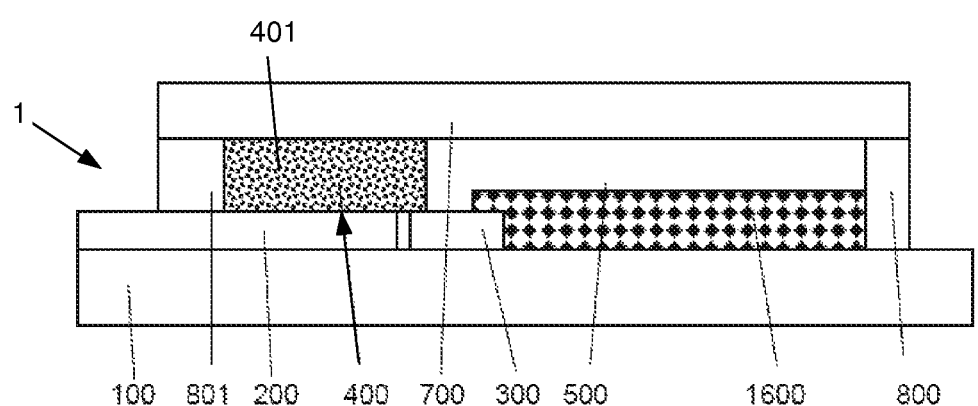

FIG. 14 shows an example such as in FIG. 10. However, the migration electrode 1500 herein is substituted by a subsystem 1600. Subsystems are allowed to be all such devices being known from the patent application PCT/EP2008/064712. The whole inventive contents disclosed there is to be included with herein.

Another example results from the cascade connection of single devices of the type described above.

FIG. 15a shows an example of an electrochemical processor 1, in a perspective view (projection in y-direction), which comprises a plurality of electrical connections 311, 312, 313, 314. The electrical connections 311, 312, 313, 314 extend in z-direction. The electrical connections 311, 312, 313, 314 are composed of the same material as the second electrode 300 of the electrochemical processor 1. They can be integrally formed with the second electrode 300. As shown in FIG. 15b, upon activation of the electrochemical processor 1 by closing the switch 1700, the second electrode 300 begins to oxidise or delaminate and an oxide layer 900 begins to form. At a point in time, the progress of the oxide layer 900, which progresses in x-direction, cuts of the first electrical contact 311 from the second electrode 300, i.e. interrupts the electrical pathway between the second electrode 300 and the electrical contact 311. According to this concept, the electrochemical processor 1 can be used for time-dependent electrical switching processes.

FIG. 15c shows a different example of the electrochemical processor 1 which comprises electrical contacts 321, 322, 323, 324, which are aligned in x-direction. These contacts are separated from each other by incisions 331, 332, 333, 334, 335 in the second electrode 300. As displayed in FIG. 13c, the progress of the oxidation and the formation of an oxide layer 900 by activation of the electrochemical processor 1, the conductive pathways of the electrical contacts (in this case contacts 321 and 322) are interrupted since these contacts are electrically separated from the second electrode 300 by the oxide layer 900. Also this example of the electrochemical processor 1 can be used for the control of time-dependent switching processes.

Figure 16:
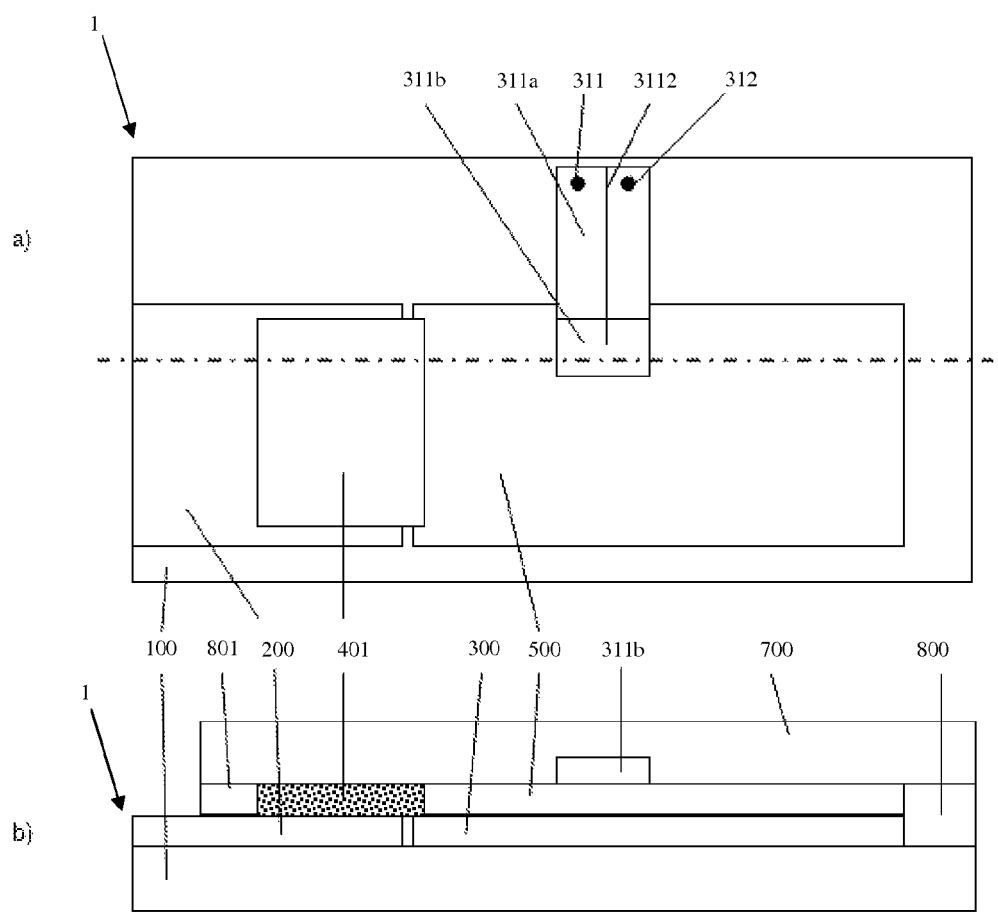
FIG. 16 shows a more detailed perspective of the electrochemical processor for use in the writing assembly, comprising several electrical connections.

FIG. 16 displays a more detailed view of an electrochemical processor 1 which comprises two electrical connections 311 and 312, which extend in z-direction. FIG. 16a is a perspective from above, whereas FIG. 16b shows a side view of this processor. The processor as depicted in FIG. 16 principally is constructed analogously as the electrochemical processor as displayed in FIG. 2. As an additional element, electrical connections 311 and 312 are present. These electrical contacts are aligned in-between the covering layer 700 and the migration layer 500. The electrical contacts 311 and 312 are made of a conductive polymer material, the electrical conductivity of which can be altered by doping. For example the electrical contacts 311 and 312 are made of polyaniline 311a, which for example can be doped with DBSA (PANI: DBSA). This polyaniline layer can be made of the electrically conductive form "emeraldine salt". The electrical contacts 311 is separated from the contact 312 via a dividing line 3112, so that electrical current cannot flow between the contacts 311 and 312. Another part of the electrical contacts 311 and 312 for example is made of an isolating layer of polyaniline in the form of emeraldine base 311b. If, for example, an acidic electrolyte is used, which extends through the migration layer 500 (see also description of FIG. 2) and the limit of the acidic electrolyte reaches the region where the electric contacts 311 and 312 are present, the emeraldine-base form of the polyanilin is reacted to emeraldine salt, wherein the emeraldine-base form of polyaniline is not electrically conductive, however, the emeraldine salt form has a high electric conductivity. Thus, the electrical contact between the electrochemical processor 1 and the periphery of said processor can be time-dependently established via the electric contacts 311 and 312.

Figure 15:
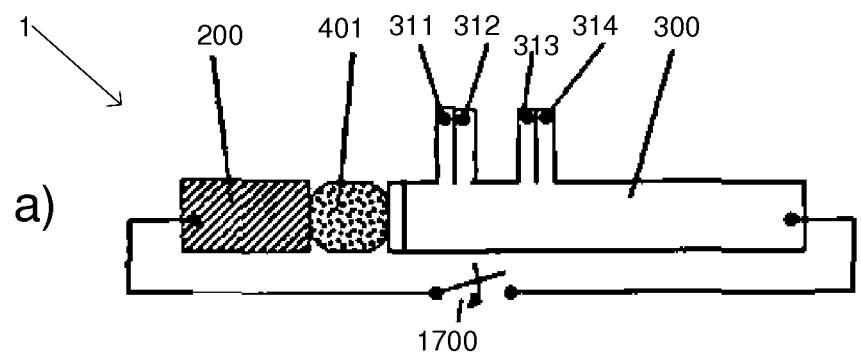
FIG. 15 shows another example, wherein the electrochemical processor for use in the writing assembly comprises several electrical connections.
Figure 15:
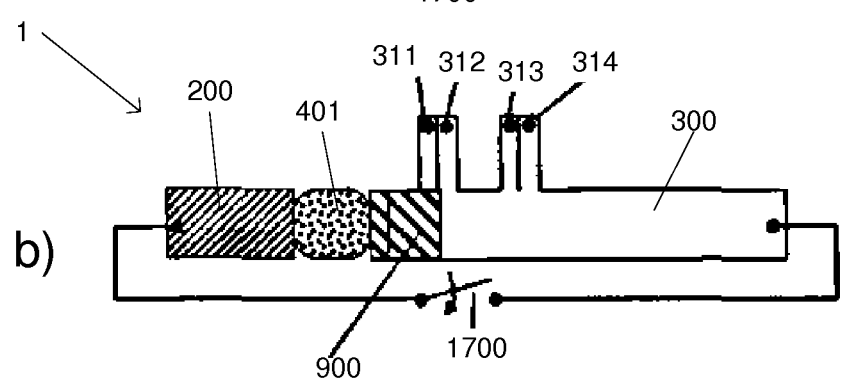
Figure 15:
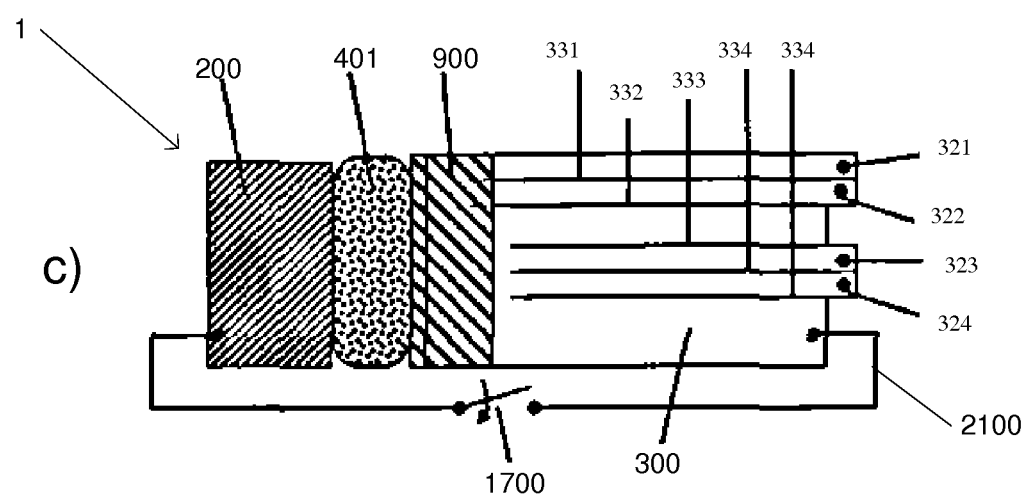

The electrochemical processors as depicted in FIGS. 15 and 16 can be used as first electrochemical processor 1a in any of the writing assemblies as described in FIGS. 17 to 21, whereas the electrical contact to the second type of electrochemical processors can be established via the electrical contacts 311 and 312.

Figure 17:
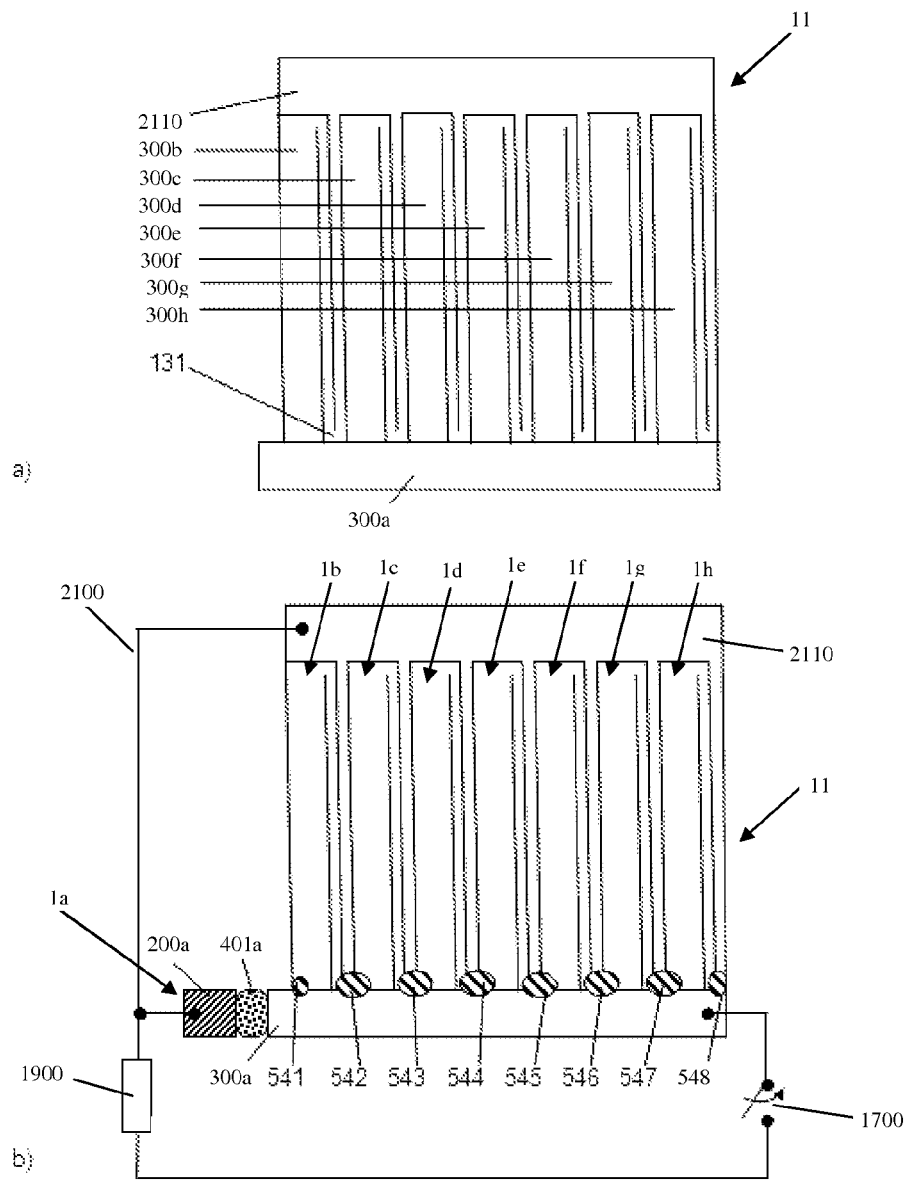
FIG. 17 shows a first example of a two-dimensional electrochemical writing assembly.
Figure 17:
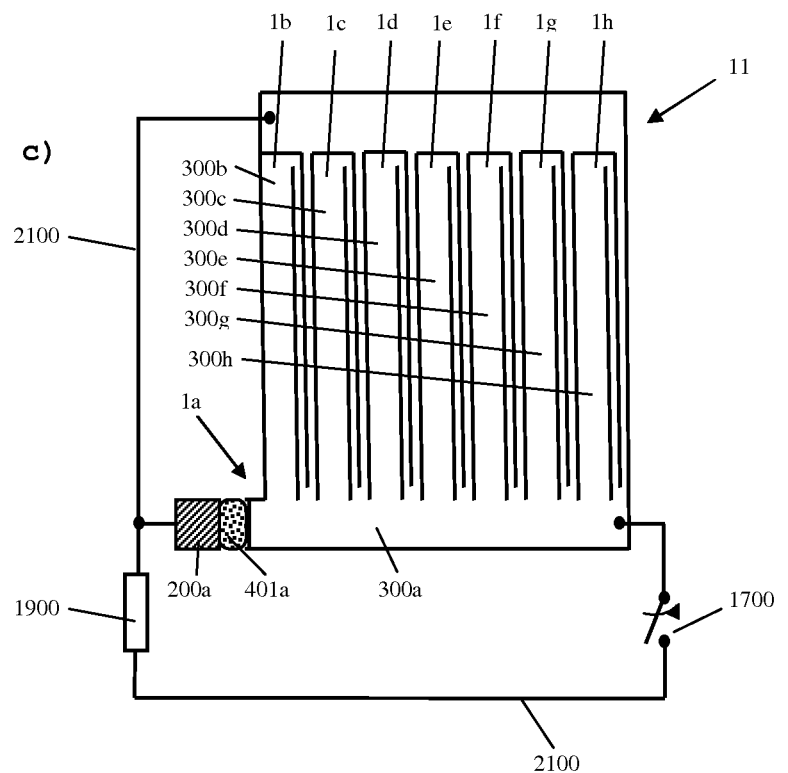
Figure 17:
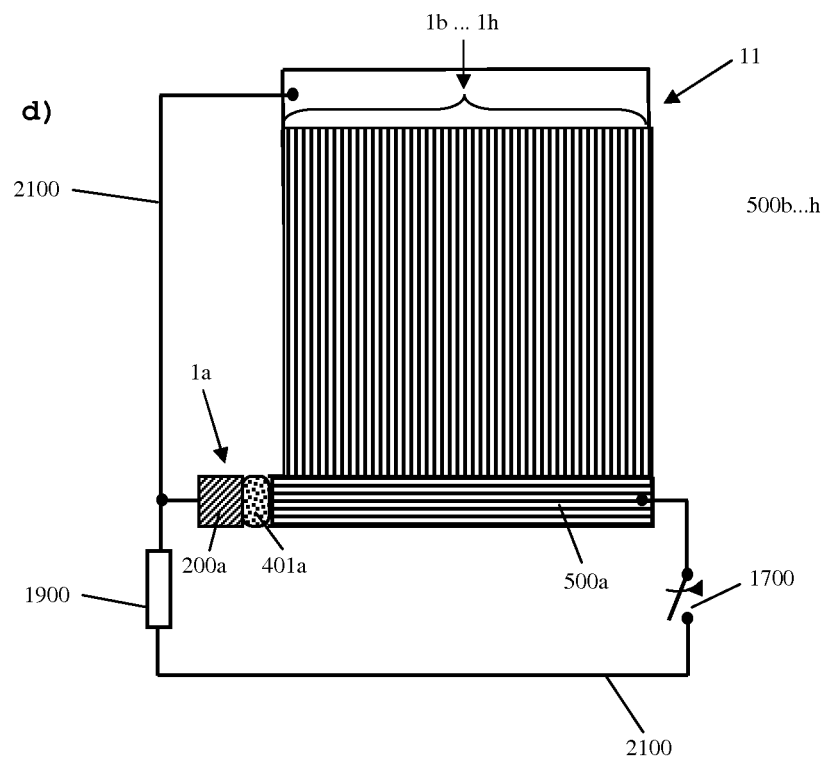
Figure 17:
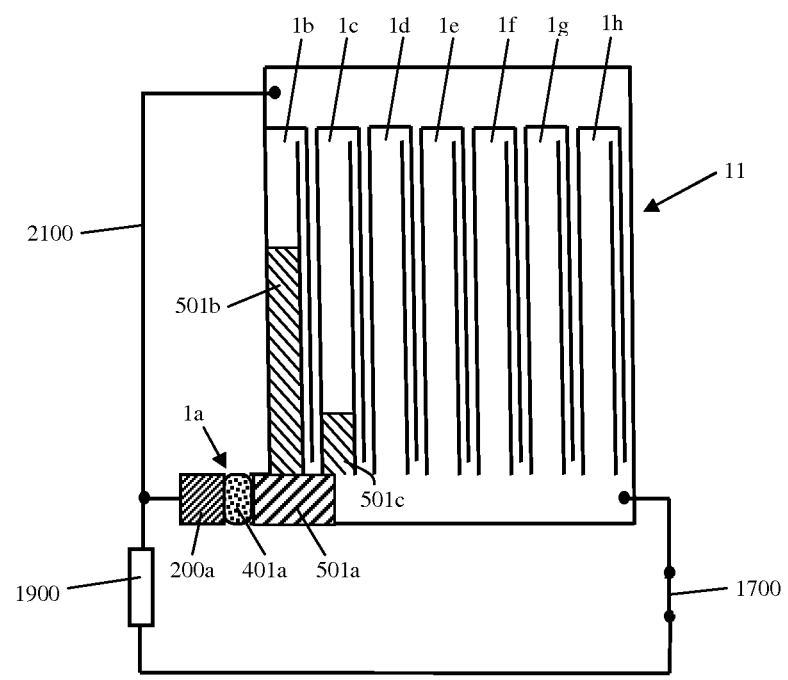

FIG. 17 shows a first example of a two-dimensional electrochemical writing assembly. FIG. 17a displays the principle alignment of the writing assembly, which comprises a first electrochemical processor 1a with a second electrode 300a, from which a plurality of second electrodes 300b, 300c, 300d, 300e, 300f, 300g, 300h of the respective second electrochemical processors 1b, 1c, 1d, 1e, 1f, 1g, 1h extend. Each second electrode 300b to 300h can be electrically connected to the electrodes 300a of the first electrochemical processor upon activation of the processor as further illustrated in detail in FIG. 17b. On the other end of said second electrodes 300b to 300h of each second electrochemical processor an electrical interconnection 2110 is aligned, which is in electrical contact with the respective electrodes 300b to 300h of the second electrochemical processors.

FIG. 17b illustrates the complete writing assembly 11, having a first electrochemical processor 1a with a first electrode 200a, an electrolyte 401a as well as a second electrode 300a. The first electrodes 200a of the first electrochemical processor 1a is electrically connected to a conductive pathway 2100, which interconnects the electrical connection 2110 with the second electrode 300a of the first electrochemical processor via the respective second electrochemical processors 1b to 1h. As mentioned above, these second electrochemical processors each comprise a respective second electrode (300b, . . . , 300h, see also FIG. 17a). This conductive pathway in addition comprises a resistive element 1900 as well as an electrical switch 1700. The second electrochemical processors 1b to 1h are electrically connectable to the second electrodes 300a of the first electrochemical processor. For example, the first electrodes 200a and the second electrodes 300a of the first electrochemical processor can be made of materials with different electrochemical potentials so that upon activation of the writing assembly by closing of the switch 1700 an anodic oxidation of the second electrodes 300a of the first electrochemical processor (time axis) begins. The resistive element 1900 lowers the oxidation velocity in the second electrodes 300a of the first electrochemical processor 1a.

Furthermore, the electrochemical processor according to the example of FIG. 17b comprises a plurality of electrolyte-absorbing layers 541 to 548, which are arranged in x-direction where the respective second electrochemical processors 1b to 1h extend from the first electrochemical processor. If the lateral oxidation of the second electrode 300a of the first electrochemical processor 1a has been progressed so far that the electrolytic frontier reaches the electrolyte-absorbing layer 541, the electrode 300b of the second electrochemical processor 1b establishes a fluidic or ionic and thus also electrical connection between the second electrode 300a and activates the second electrochemical processor 1b (column processor) by uptake or sorption of the electrolyte. Before, the first 1a and second 1b electrochemical processors were divided by a dividing line and are therefore isolated from each other. Thus, an electrolytic interconnection between the second electrodes 300a of the first electrochemical processor and the electrochemical processor 1b can be established, on which a lateral anodic oxidation of the electrode 300b of the second electrochemical processor begins. This lateral anodic oxidation is faster than the lateral anodic oxidation of the second electrode 300a of the first electrochemical processor 1a since no resistive element is present between the second electrodes 300a of the first electrochemical processor and the electrical contact 2110. Therefore, the first column processor (second electrochemical processor) 1b is oxidized with higher velocity in z-direction (illustrated vertically in FIG. 17) as the lateral anodic oxidation progresses within the first electrochemical processor 1a (in the second electrode 300a in x-direction (illustrated horizontally in FIG. 17 from left to right). When the electrolytic frontier in the electrochemical processor 1a has reached the electrolyte absorbing layer 542, the area 131 will be oxidized and therefore the electric connection to the first second electrochemical processor 1b is interrupted. Furthermore, electric contact is established in the same manner to the second electrochemical processor 1c, until this column processor again is switched off via the electrolyte absorbing layer 543. In this manner, sequentially the subsequently aligned electrochemical processors 1b to 1h are switched on and off. Since the writing velocity of the column processors 1b to 1h as well as the absorbing velocity of the electrolyte absorbing layers 541 to 548 are tem-temperature-dependent, the up-time of the respective column processors 1b to 1h is dependent on the temperature at the point of activation. In this manner, a temperature-time diagram can be established. The assembly according to FIG. 17 also can be modified. The first electrochemical processor as well as the column processor can be composed in a different manner, such as, e.g., any of the processors as described in FIGS. 1 to 15. In addition, for the electrolyte-absorbing layers 541 to 548, the materials as described for the migration layer before, especially cellulose can be used. For reduction in the migration velocity of the electrolyte in a migration layer (electrolyte-absorbing layer), the layer additionally can be impregnated with silicone oil. In an example, the migration layer can be composed of a material with capillary effect, which additionally can be impregnated with silicone oil. Furthermore, the resistive element 1900 as well as the switch 1700 can be omitted. Furthermore, the transfer of the electrolyte from the first electrochemical processor 1a to each of the second electrochemical processors 1b to 1h can be established via the electrolyte-absorbing layers 541 to 548, respectively.

In addition, the electrochemical writing assembly 11 according to the example of FIG. 17c is composed similar to the example as discussed in FIGS. 17a and 17b as above. In contrast to the aforementioned examples according to FIGS. 17a and 17b, in the example according to FIG. 17c the first electrochemical processor 1a as well as the plurality of second electrochemical processes 1b, . . . , 1h have a continuous electrode, wherein the respective electrodes 300a and 300b, . . . , 300h of the two types of electrochemical processors are merging. For reasons of clarity, the reference numerals as given in FIGS. 17a and 17b partially have been omitted.

FIG. 17d shows another detail of the electrochemical writing assembly 11 as displayed in FIG. 17c. The electrode 300a of the first electrochemical processor 1a (see FIG. 17c) is covered with a migration layer 500a, which for example is made of cellulose, which can be impregnated with an oil, such as a silicone oil. This migration layer 500a has a very small migration velocity for the electrolyte 401a of the first electrochemical processor 1a. The respective second electrodes 300b, . . . , 300h of the plurality of the electrochemical processes of the second type, i.e. processes 1b, . . . , 1h are covered with an insulating material 500 or a migration layer 500b, . . . , 500h, which exhibits different migration characteristics for electrolytes compared with the migration layer 500a. For example, the insulating material 500b, . . . , 500h is made of an acrylic varnish. The migration velocity of an electrolyte within the processors of the second type therefore is higher compared to the migration velocity of the electrolyte within the processor of the first type with the migration layer 500a.

FIG. 17e demonstrates another view of the electrochemical writing assembly 11 as displayed in FIG. 17d. For reasons of clarity, the migration layers 500a and 500b, . . . , 500h are depicted transparent, i.e. they are not shown. In FIG. 17e the electrochemical writing assembly 11 has already been activated, e.g. by closing the switch 1700. Once activated, relying on the principles as described before, in the first electrochemical processor 1a, the electrolyte 401a begins to migrate in x-direction into the migration layer 500a (not shown). The part of the migration layer 500, into which the electrolyte has already been migrated is depicted with reference numeral 501a. Once the frontier of the electrolyte 401a has passed the beginning of the electrochemical processor 1b in x-direction, this column processor is activated. Due to the fact that, e.g., the first second electrochemical processor 1b has a higher migration velocity for the electrolyte 401a, the migration of the electrolyte within said processor 1b proceeds faster than within the migration layer of the first electrochemical processor 500a. FIG. 17e displays a snapshot of the already activated electrochemical writing assembly 11, in which the frontier of the electrolyte 401a in the migration layer 500a of the first electrochemical processor 1a has already passed the first electrochemical processor 1b (in x-direction) so that the first second electrochemical processor 1b has been activated and shut off again. Therefore, the electrolyte 401a also has proceeded and migrated into the second electrochemical processor 1b, as depicted with reference numeral 501b. Furthermore, the snapshot as displayed in FIG. 17e demonstrates that the second second electrochemical processor 1c is activated and the electrolyte has begun to migrate into the second second electrochemical processor 1c, which is depicted with reference numeral 501c. Due to the fact that the migration velocity of the electrolyte within the processors of the second type for example depends on the ambient temperature, the final migration frontiers of the electrolyte within the second processors 500b, . . . , 500h will differ. Therefore, a time-dependent correlation of the migration frontiers of the electrolyte within the second electrochemical processors 1b, . . . , 1h (in y-direction) can be correlated to the temperature. The first electrochemical processor 1a functions as timer or timeline processor for switching on and off the second types of electrochemical processors 1b, . . . , 1h.

Figure 18:
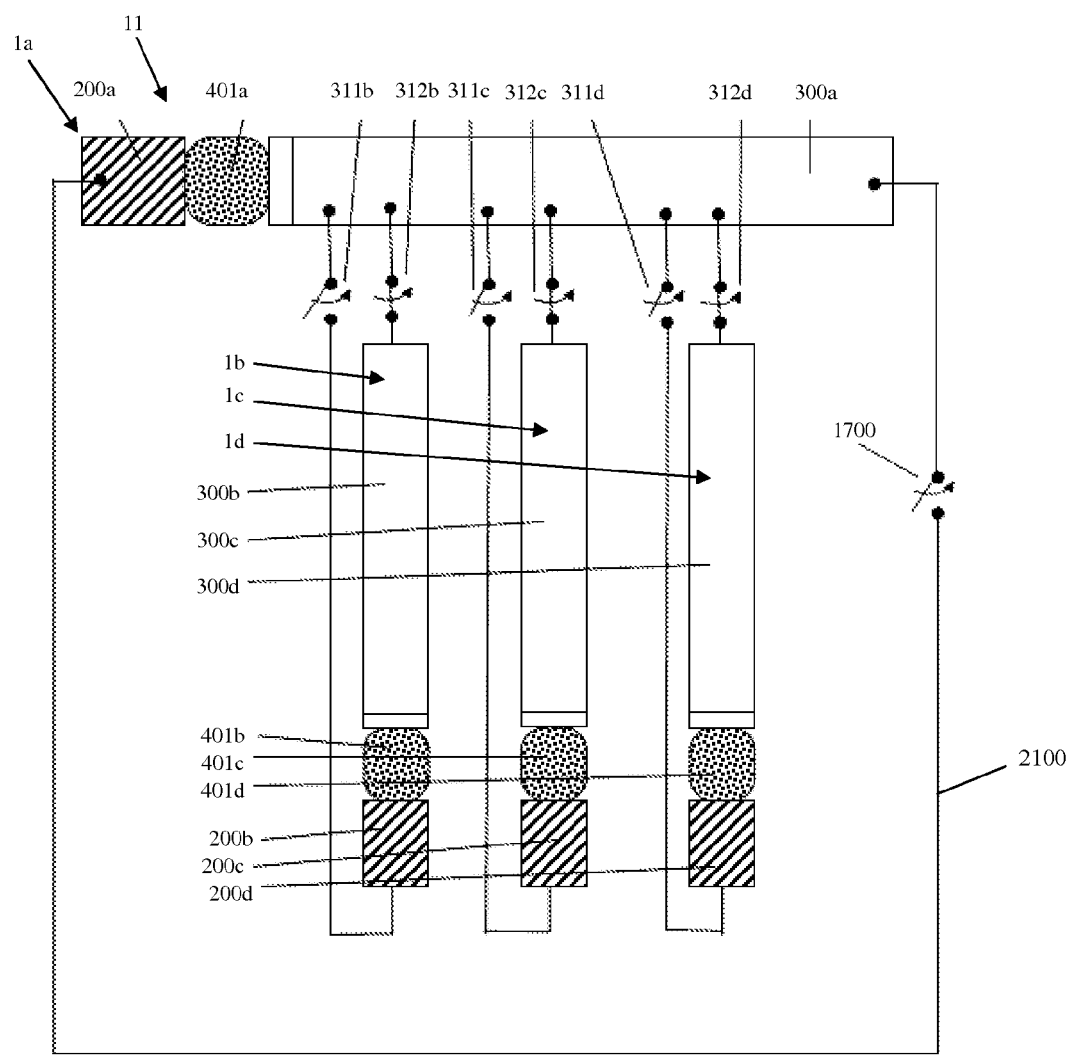
FIG. 18 shows a second example of a two-dimensional electrochemical writing assembly.

FIG. 18 shows a second example of a two-dimensional electrochemical writing assembly.

The writing assembly 11 according to FIG. 18 comprises two types of the electrochemical processors 1 described before, namely a first electrochemical processor 1a and—in this case three—second electrochemical processors 1b, 1c, 1d. According to this example, the three second electrochemical processors 1b, 1c, 1d are switched on and off subsequently. Between switching on and off the second electrochemical processors 1b, 1c, 1d the writing process takes place. According to the example as demonstrated in FIG. 18, the first electrochemical processor 1a comprises a first electrode 200a and a second electrode 300a. These electrodes are in contact via the electrolyte 401a. Not displayed in FIG. 18 and all subsequent figures is the insulating material 500 or the migration layer 500, which covers the second electrodes 300 of all electrochemical processors, used in the subsequent example. The insulating material 500 or the migration layer 500a are not displayed for the sake of clarity. However, the presence of the insulating material 500 or migration layer 500 is not mandatory. The second electrodes 300a of the first electrochemical processor 1a is connected to the first electrode 200a via an external conductive pathway 2100, which comprises a switch 1700. In the case as demonstrated in FIG. 18, the first electrodes 200a and the second electrodes 300a of the first electrochemical processor have different electrochemical potential, so that a lateral oxidation of the second electrode 300a of the first electrochemical processor is possible upon closing of the electrical switch 1700.

The three second electrochemical processors 1b, 1c and 1d are electrically connected to the second electrode 300a of the first electrochemical processor by respective electrical contacts 311b, 312b; 311c, 312c and 311d and 312d. In this example, the respective electrical connections 311b connect the second electrode 300a of the first electrochemical processor 1a with the respective first electrode 200 of the respective second electrochemical processor, whereas the respective electrical contact 312 connects the second electrode 300a of the first electrochemical processor with the respective second electrodes 300 of the respective second electrochemical processor. For instance, the respective electrical interconnection 311b, 311c, 311d connects the electrode 300a of the first electrochemical processor 1a with the respective first electrodes 200b, 200c, 200d of the respective second electrochemical processor 1b, 1c, 1d; whereas the respective electrical connection 312b, 312c, 312d establishes an electrical interconnection of the second electrode 300a of the first electrochemical processor 1a with the respective second electrodes 300b, 300c, 300d of the respective second electrochemical processor 1b, 1c, 1d. With respect to the x-direction of the first electrochemical processor 1a, the contacts 311b, 311c, 311d can be established before the respective contact 312b, 312c, 312d, i.e. the contacts 311 are aligned further to the left in x-direction with respect to the corresponding contact 312, as displayed in FIG. 18. However, it is also possible that the respective contact 312 is aligned further left in x-direction with respect to the respective contact 311 (this example is not displayed, however, is realized when contact points 311 and 312 are interchanged in FIG. 18 in x-direction).

The respective first (200*b*, 200*c*, 200*d*) and second electrodes (300*b*, 300*c*, 300*d*) of the second electrochemical processors (1*b*, 1*c*, 1*d*) are electrically interconnected to each other via a respective electrolyte (401*b*, 410*c*, 401*d*); therefore, in principle, each second electrochemical processor (1*b*, 1*c*, 1*d*) is constructed in an identical or singular manner in the first electrochemical processor 1*a* as used in the writing assembly 11 according to the example as displayed in FIG. 18. However, the processors 1*a* and 1*b*, 1*c*, 1*d* also can be different, e.g. the first processor 1*a* can comprise an oil-impregnated migration layer composed of cellulose, whereas such a migration layer is not present in the second processor 1*b*, 1*c*, 1*d*.

Upon activation of the switch 1700, the second electrodes 300*a* of the first electrochemical processor begins to oxidize anodically in a lateral direction (x-direction). With progressing of the oxidation of the second electrodes 300*a*, the electrical contacts 311*b*, 311*c*, 311*d*, are established i.e. the "switches" are closed, whereas the contacts 312*b*, 312*c*, 312*d* interrupted subsequently. This is indicated with a respective arrow at the aforementioned contacts. If the oxidizing frontier upon activation of the writing assembly 11 by closure of the switch 1700 in the second electrodes 300*a* reaches the first electrical contact 311*b*, the second electrochemical processor 1*b* is activated. When the oxidation frontier in the second electrodes 300*a* reaches the second electrical contact 312*b* and thus interrupts the electrical connection of the second electrodes 300*a* and the second electrochemical processor 1*b*, the second electrochemical processor 1*b* is switched off. Subsequently, the next column processor 1*c* is activated via the electrical connection 311*c* and again switched off via the electrical connection 312*c* and so on.

Figure 19:
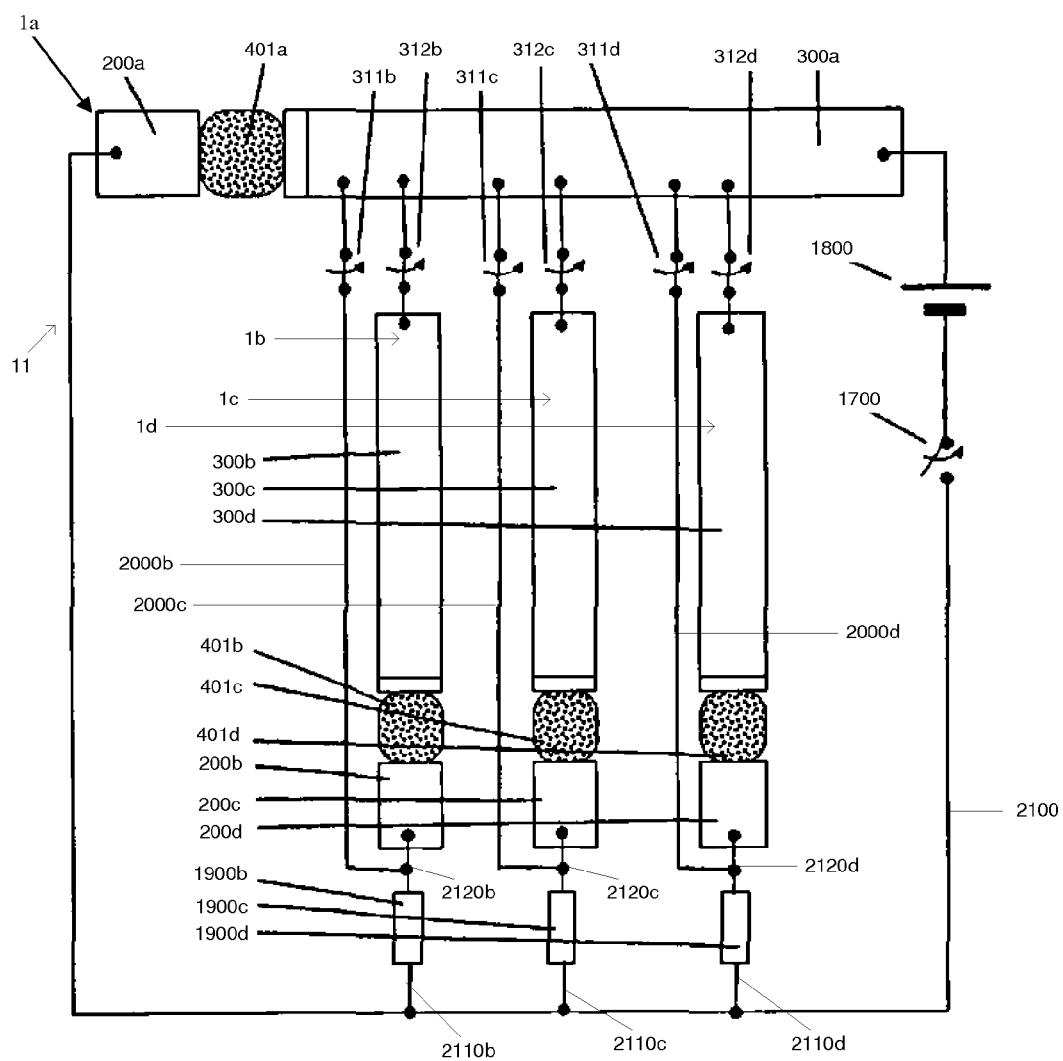
FIG. 19 shows a third example of an electrochemical writing assembly.

FIG. 19 displays in a third example a two-dimensional electrochemical writing assembly 11, which comprises two groups of the before described electrochemical processors 1, namely a first electrochemical processor 1*a* and—in this case 3—second electrochemical processors 1*b*, 1*c*, 1*d*. According to this example, the three second electrochemical processors 1*b*, 1*c*, 1*d* are switched on and off subsequently. Between switching on and off the second electrochemical processors 1*b*, 1*c*, 1*d*, the writing process takes place.

According to the example as given in FIG. 19, the first electrochemical processor 1*a* comprises a first electrode 200*a* and a second electrode 300*a*. These electrodes are in contact via the electrolyte 401*a*. Not displayed in FIG. 19 (and all subsequent figures) is the insulating material 500, which covers the second electrode 300 of all electrochemical processors used in the subsequent examples. The insulating material 500 is not displayed for the sake of clarity.

The second electrode 300*a* of the first electrochemical processor 1*a* is connected to the first electrode 200*a* via an external conductive pathway 2100, which comprises a switch 1700. Additionally, this pathway comprises a galvanic element or battery 1800, which allows the material of the first electrodes 200*a* and the second electrodes 300*a* to be the same, e.g. aluminium.

Between the external conductive pathway 2100 and the second electrode 300*a* of the first electrochemical processor 1*a*, three second electrochemical processors 1*b*, 1*c* and 1*d* are aligned. Each second electrochemical processor 1*b*, 1*c*, 1*d* is constructed in the same manner as the first electrochemical processor 1*a*, i.e. each second electrochemical processor 1*b*, 1*c*, 1*d* comprises a first electrode 200*b*, 200*c*, 200*d*, a second electrode 300*b*, 300*c*, 300*d* and an electrolyte 401*b*, 401*c*, 401*d* respectively, which inter-connects the respective second electrode with the first electrode.

The first electrode 200*b*, 200*c*, 200*d* of the respective second electrochemical processor 1*b*, 1*c*, 1*d* is connected via an electrical contact 2110*b*, 2110*c*, 2110*d*, respectively, this contact line comprises a resistive element 1900*b*, 1900*c*, 1900*d*. Each second electrode 300*b*, 300*c*, 300*d* of the respective second electrochemical processor 1*b*, 1*c*, 1*d* is connected via an electrical contact 312*b*, 312*c*, 312*d* with the second electrodes 300*a* of the first electrochemical processor 1*a*. These electrical contacts 312*b*, 312*c*, 312*d* are subsequently arranged in progressing x-direction of the first electrochemical processor 1*a*. Between the respective resistive elements 1900*b*, 1900*c*, 1900*d* and the respective first electrodes 200*b*, 200*c*, 200*d* of each second electrochemical processor 1*b*, 1*c*, 1*d*, a contact point 2120*b*, 2120*c*, 2120*d* is aligned, from which a bypass line 2000*b*, 2000*c*, 2000*d* extends. This bypass line connects the contact point 2120*b*, 2120*c*, 2120*d* with the electrical contacts 311*b*, 311*c*, 311*d* of the second electrode 300*a* of the first electrochemical processor 1*a*.

Upon activation of the switch 1700, the second electrode 300*a* begins to oxidise anodically in a lateral direction (x-direction). With progressing oxidation of the second electrode 300*a*, the electrical contacts 311*b*, 312*b*, 311*c*, 312*c*, 311*d*, 312*d* are interrupted subsequently. This is indicated with an arrow at each of the afore-mentioned contacts. The second electrodes 300*b*, 300*c*, 300*d* of the second electrochemical processors 1*b*, 1*c*, 1*d* and the first electrodes 200*b*, 200*c*, 200*d* are made of the same material. Since the second electrodes 300*b*, 300*c*, 300*d* and the first electrodes 200*b*, 200*c*, 200*d* are shorted via the bypasses 2000*b*, 2000*c*, 2000*d*, the second electrodes 300*b*, 300*c*, 300*d* firstly are not oxidised laterally. After opening of the electrical contact 311*b* due to the fact that the lateral oxidation of the second electrode 300*a* progresses, the voltage supplied by the voltage source 1800 is applied between the first electrode 200*b* and the second electrode 300*b* of the second electrochemical processor 1*b*. Due to this voltage applied to the electrochemical processor 1*b*, also the second electrode 300*b* begins to oxidise laterally. This progressing lateral anodic oxidation of the second electrodes 300*b* is ended, when the progress of lateral anodic oxidation of the second electrode 300*a* of the first electrochemical processor 1*a* reaches the electrical contact 312*b*. This process is reiterated for the subsequent second electrochemical processors 1*c* and 1*d*.

Figure 20:
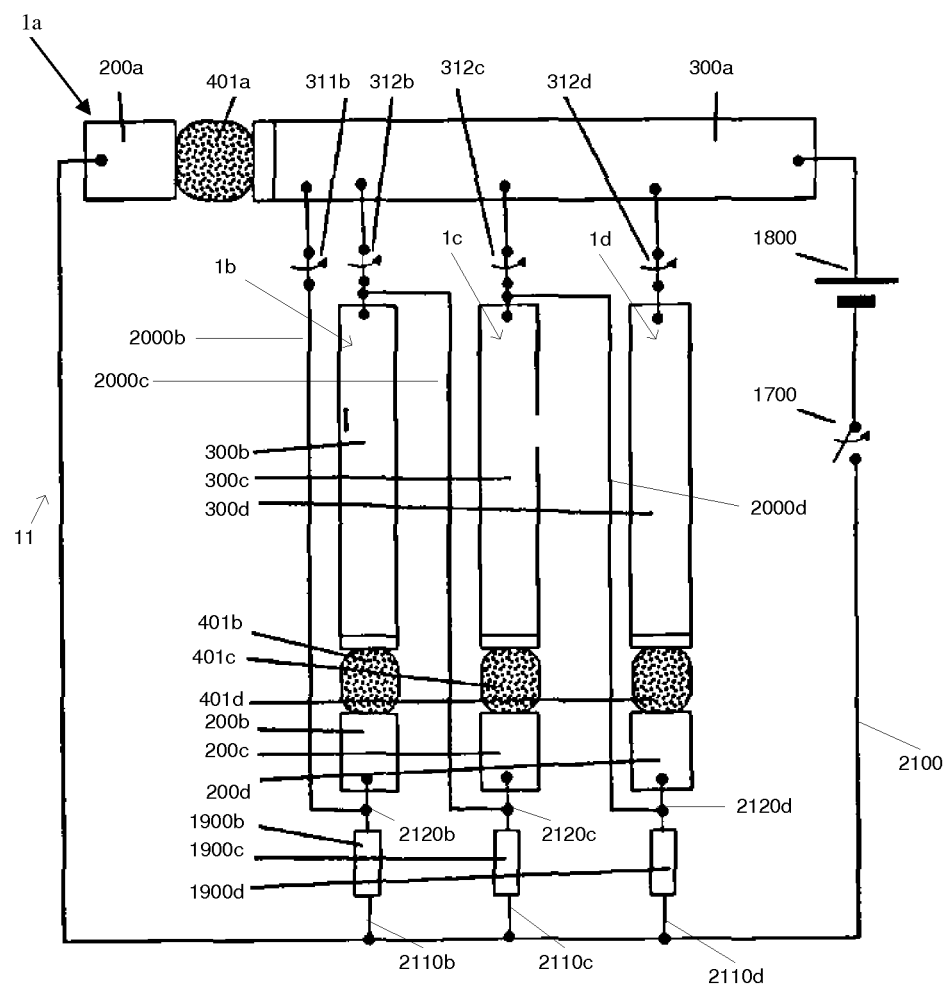
FIG. 20 shows a fourth example of a two-dimensional electrochemical writing assembly.

FIG. 20 describes an example of the writing assembly 11, in which the switch-off time of the preceding second processor is identical with the switch-on time of the subsequent second electrochemical processor.

The example according to FIG. 20 is the same as described for FIG. 19 except for the bypasses 2000*c*, 2000*d* of the second electrochemical processors 1*c*, 1*d*. These bypasses begin at the contact points 2120*c*, 2120*d* and have endpoints at the electrical connection 312*b*, 312*c* of the preceding second electrochemical processor 1*b*, 1*c*. If the first second electrochemical processor 1*b* is switched on, due to the fact that the laminar anodic oxidation of the second electrode 300*a* of the first electrochemical processor progresses beyond the contact points 311*b*, the first second electrochemical processor 1*b* is switched on. The electrical bypass 2000*c* of the second second electrochemical processor 1*c* ensures that as long as the electrical connection of the second electrode 300*c* of the second electrical processor 1*c* and the second electrode 300*a* of the first electrochemical processor 1*a* is established via the contact point 312b, the electrodes 200c and 300c of the second electrochemical processor 1c have the same potential and therefore the second chemical processor is not switched on until the contact point 312b has been corroded or delaminated. If the lateral oxidation of the second electrodes 300a of the first electrochemical processor 1a progresses beyond the contact point 312b, simultaneously the first second electrochemical processor 1b and the bypass 2000c of the second second electrochemical processor 1c are deactivated. Therefore, the second second electrochemical processor 1c is activated.

Figure 21:
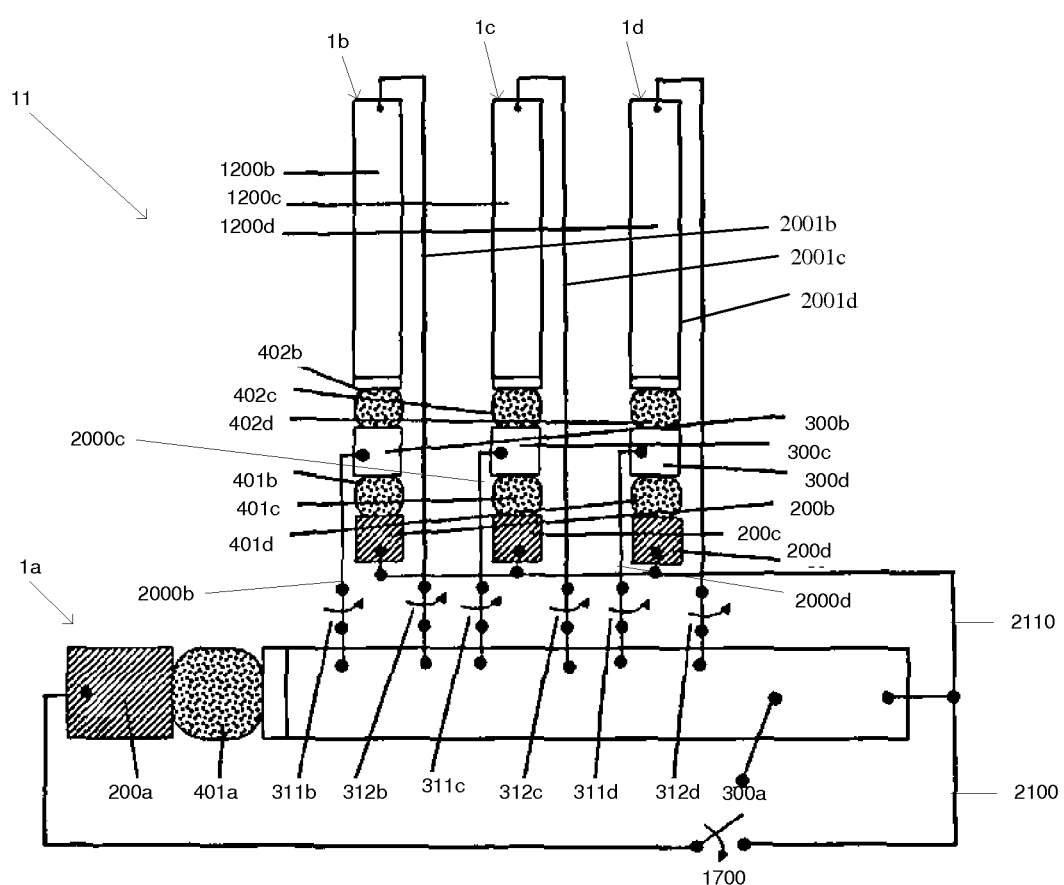
FIG. 21 shows a fifth example of a two-dimensional electrochemical writing assembly.

FIG. 21 displays a further e example of a writing assembly 11, which does not need an additional voltage source, such as a galvanic element. In this example, the first electrode 200 of all displayed electrochemical processors 1a, 1b, 1c, 1d is made of a material which has a different electrode potential compared with the second electrodes (or the third electrodes 1200). For example, the first electrode 200 of the processors can be PEDOT:PSS, whereas the second electrodes can be made of aluminium. These materials differ in their electrode potentials by approximately 1 Volt. Therefore, upon activation of the writing processor 11 by closing the switch 1700, a self-oxidation of the respective second electrode 300a or the third electrodes 1200b, 1200c, 1200d of the second electrochemical processors 1b, 1c, 1d takes place. In the example according to FIG. 21, the second electrochemical processors 1b, 1c, 1d comprise three electrodes, namely first electrodes 200, second electrodes 300 and third electrodes 1200. These electrodes are separated from each other by a first electrolyte 401 (between the first and the second electrode) and a second electrolyte 402 (between the second and the third electrode).

The first electrodes 200b, 200c, 200d are connected via an electrical pathway 2110 with the second electrode 300a of the first electrochemical processor 1a. The third electrodes 1200b, 1200c, 1200d of the respective second electrochemical processor 1b, 1c, 1d are connected via electrical contacts 312b, 312c, 312d with the second electrodes 300a of the first electrochemical processor 1a. These contacts are aligned in progressing x-direction with respect to the second electrode 300a of the first electrochemical processor 1a. Also this writing processor 11 comprises electrical bypasses 2000b, 2000c, 2000d of each of the second electrochemical processors 1b, 1c, 1d. This bypass 2000b, 2000c, 2000d interconnects the second electrodes 300b, 300c, 300d of the respective second electrochemical processor 1b, 1c, 1d with the second electrodes 300a of the first electrochemical processor 1a via the contact points 311b, 311c, 311d. With respect to x-direction (of the second electrodes 300a of the first electro-electrochemical processor 1a), the contact point 311b is aligned earlier than the contact point 312b. The same holds true for the contact points 311c and 312c as well as 311d and 312d.

If the writing assembly 11 is activated by the closure of the switch 1700, the progress of the lateral oxidation of the second electrode 300a of the first electrochemical processor 1a guarantees the opening of the electrical connection 311b, so that between electrodes 300b and 200b of the second electrochemical processor 1b, an electrical potential difference is applied, which leads to a potential difference between electrode 300b and 1200b. Therefore, a lateral anodic oxidation of the third electrode 1200b begins. The progress in lateral anodic oxidation in the second electrode 300a of the first electrochemical processor 1a leads to an opening of electrical contact 312b and therefore to a switch-off of the electrochemical processor 1b. The writing process of the second electrochemical processor 1b therefore is ended. By opening of the electrical switch 311c, the writing process for the second column begins etc.

It is desirable if the temperature dependency of the velocity of the lateral oxidation within the first electrochemical processor 1a is as low as possible, whereas the temperature dependency of the velocity of the lateral anodic oxidation within the second electrochemical processor is as high as possible. This can be achieved, if a resistive element is applied as described above or the electrode, which is to be oxidised, comprises an oxidic layer on its first surface. Moreover, additional layers, such as "soft" insulating layers, such as e.g. soft polymeric layers, as PVC, oils, fats or water-in-oil-emulsions can be applied to the electrode to be oxidized. As alternative or additional possibilities, the respective electrode of, e.g., the first processor can comprise a migration layer made of cellulose, which additionally can be impregnated with an oil such as a silicone oil.

Of course, the afore-mentioned systems are not restricted to the presence of three second electrochemical processors, more second electrochemical processors can be applied in the same way, e.g. 10, 20, 30, 40, 50, 60 or more second electrochemical processors.

Each of the first electrochemical processors 1a as displayed in FIGS. 17 to 21 can be composed analogously as the electrochemical processor depicted in FIGS. 15 and/or 16.

FIG. 22 describes the switching principle of a writing processor. As far as FIG. 22a is concerned, a time-dependent axis 3600 is present, which activates or deactivates the respective columns 31xx (3101 to 3107). In the before discussed examples, the time-dependent axis 3600 is represented by the second electrodes 300a of the first electrochemical columns 1a. The respective processors 31xx are represented by the electrodes of the respective second electrochemical processors which are oxidised. Furthermore, FIG. 22a displays the parts of each electrochemical processor, which has been "written", too. These parts are referred to with reference numerals 311x (3111 to 3117).

The elements 321x (3211 to 3217) as well as 322x (3221 to 3227) represent the electrical and/or fluid components, which inter-connect the active layers of the writing processor with each other.

As shown in FIG. 22b, the time-dependent axis 3600 can also be aligned on the opposite side compared with FIG. 22a.

With help of the time-dependent axis 3600, therefore, the respective columns 310x (3101 to 3107) are switched sequentially. According to this principle, a processor (=column) i is activated and switched off after a time interval $\Delta t_w$, whereas at the same time or later, the processor (=column) (i+1) is activated. For possible writing velocities v of the columns (writing of the columns with the writing velocity v), the following relations are possible:

with $v=f(T)$ und $\Delta t_w \neq f(T)$ or with $v \neq f(T)$ und $\Delta t_w = f(T)$ or with $v=f(T)$ und $\Delta t_w = f(T)$ and different temperature dependencies.

T=temperature
v=writing velocity
$\Delta t_w$=writing time of a single column

Figure 23:
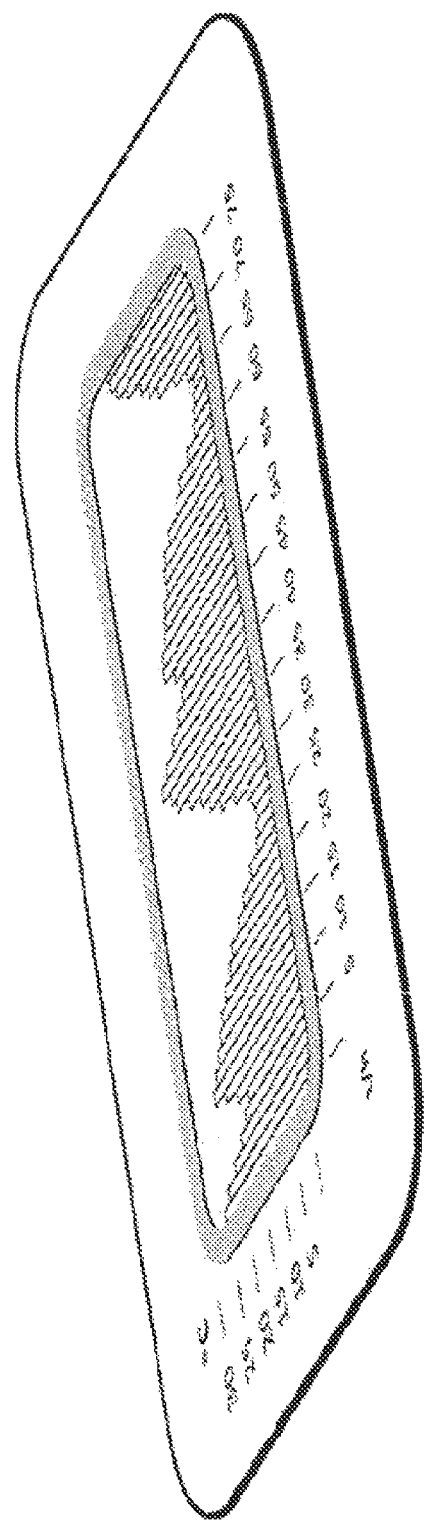
FIG. 23 shows an application of a two-dimensional electrochemical writing processor as a thermograph.

FIG. 23 displays a possible application of a two-dimensional electrochemical writing processor; according to this example, an assembly is provided which is able to record the course of the temperature depending on the time. The display comprises a plurality of second electrochemical processors.

These processors are switched on and subsequently switched off, wherein the writing velocity of each of the second electrochemical processors is temperature-dependent. According to this example, a time-dependent recording of temperature can be displayed.

What is claimed is:

1. A two-dimensional electrochemical writing assembly, comprising:
   a) at least one first electrochemical processor which can be activated at defined times, comprising at least one fluid, which is spreadable in at least one spatial direction after activation, at least one interconnection which is localized in at least one special direction which can be activated and/or deactivated when contacted with the fluid, and
   b) at least one second electrochemical processor which is functionally connected with the at least one first electrochemical processor via the at least one interconnection, which can be activated and/or deactivated via the at least one interconnection, comprising at least one fluid, which is spreadable in at least one spatial direction after activation,
      wherein the activation or deactivation of the two dimensional electrochemical writing assembly is established by closing or opening of an electrical switch so the fluid of the first electrochemical processor is transported through the interconnection to activate the second electrochemical processor.

2. The two-dimensional electrochemical writing assembly according to claim 1, wherein the second electrochemical processor comprises an indicator layer which upon activation can be contacted by the fluid being comprised in the electrochemical processor.

3. The two-dimensional electrochemical writing assembly according to claim 2, wherein said indicator layer changes its optical properties upon establishing contact with the fluid spreading in at least one spatial direction.

4. The two-dimensional electrochemical writing assembly according to claim 1, wherein
   a) at least one first electrochemical processor comprises
      i) a first electrode, an electrolyte which covers at least a part of the first electrode and extends beyond the first electrode in x-direction wherein the electrolyte contacts a material selected from the group consisting of materials with capillary action,
      or
      ii) a first electrode and a second electrode each having first and oppositely arranged second surfaces, wherein the first electrode and the second electrode have different or the same electrode potentials and are physically separated from each other in x-direction, an electrolyte which covers at least a part of a first surface of the first electrode and a part of the first surface of the second electrode in y-direction and electrically interconnects said first electrode with the second electrode, wherein at least a part of the first surface of the second electrode which is uncovered by the electrolyte is covered in y-direction with a material selected from the group consisting of electrically insulating materials or materials with capillary action, which borders the electrolyte, and
   b) at least one second electrochemical processor comprises at least one electrode wherein the activation of the at least one second electrochemical processor enables a lateral delamination, decomposition and/or oxidation of the electrode,
      wherein the first electrode of the first electrochemical processor is electrically connectable to the material or the second electrode or, if present, a third electrode, a migration electrode or a subsystem of the first electrochemical processor via an external conductive pathway which comprises a switch for completion of the electric circuit,
      each of the electrodes of the at least one second chemical processor is electrically connected to the external conductive pathway and/or each of the electrodes of the at least one second electrochemical processor is electrically connected to the material or the second electrode or, if present, the third electrode, the migration electrode or the subsystem of the first electrochemical processor.

5. The two-dimensional electrochemical writing assembly according to claim 4, wherein each of the at least one second electrochemical processor comprises:
   a) a first electrode and a second electrode each having first and oppositely arranged second surfaces, wherein the first electrode and the second electrode have different or the same electrode potentials and are physically separated from each other in x-direction,
   b) an electrolyte which covers at least a part of a first surface of the first electrode and a part of the first surface of the second electrode in y-direction and electrically interconnects said first electrode with the second electrode,
      wherein at least a part of the first surface of the second electrode which is uncovered by the electrolyte is covered in y-direction with an material selected from the group consisting of electrically insulating materials or materials with capillary action which borders the electrolyte,
      wherein the first electrode of the first electrochemical processor is electrically connectable to the second electrode or, if present, a third electrode, a migration electrode or a subsystem of the first electrochemical processor via an external conductive pathway which comprises a switch for completion of the electric circuit, each of the first electrodes of the at least one second chemical processor is electrically connected to the external conductive pathway and each of the second electrodes or, if present each of third electrodes, each of migration electrodes or each of subsystems of each of the at least one second electrochemical processor is electrically connected to the second electrode or, if present, the third electrode, the migration electrode or the subsystem of the first electrochemical processor.

6. The two-dimensional electrochemical writing assembly according to claim 5, wherein the pathway comprises at least one of a voltage source.

7. The two-dimensional electrochemical writing assembly according to claim 6, wherein the voltage source is selected from at least one of a gal-galvanic element, a battery, or a resistive element.

8. The two-dimensional electrochemical writing assembly according to claim 5, wherein the second electrode and/or, if present, the third electrode of the first electrochemical processor comprises at least one electrical connection, which is arranged in the z-direction and/or at least one electrical connection, which is arranged in the x-direction for electrically connecting the second electrode and/or, if present, the third electrode of the first electrochemical processor with the at least one second electrochemical processor.

9. The two-dimensional electrochemical writing assembly according to claim 5, wherein between each of the first electrodes of the at least one second electrochemical processor and the external conductive pathway at least one resistive element is present.

10. The two-dimensional electrochemical writing assembly according to claim 4, wherein the writing assembly comprises at least one, preferably at least three second electrochemical processors wherein the at least one, preferably at least three second electrochemical processors are aligned parallel and/or equidistant and/or the electrical connections are aligned essentially equidistant or equidistant in x-direction on the second electrode or, if present, a third electrode, the migration electrode or the subsystem of the first electrochemical processor.

11. The two-dimensional electrochemical writing assembly according to claim 4, wherein each of the at least one second electrochemical processor comprises at least one electrical bypass, which electrically interconnects a contact point, which is arranged at the electrical interconnection of each of the at least one respective second electrochemical processor, with the second electrode or, if present, the third electrode, the migration electrode or the subsystem of the first electrochemical processor, thereby electrically connecting the external conductive pathway with the second electrode or, if present, the third electrode, the migration electrode or the subsystem of the first electrochemical processor, wherein preferably the contact point of the electrical bypass is arranged between the at least one resistive element of the respective second electrochemical processor and the respective second electrochemical processor.

12. The two-dimensional electrochemical writing assembly according to claim 11, wherein with respect to the x-direction of the second electrode or, if present, the third electrode, the migration electrode or the subsystem of the first electrochemical processor, each of the electrical connections of the at least one electrical bypass is arranged before the respective electrical connection.

13. The two-dimensional electrochemical writing assembly according to claim 1, wherein the writing assembly comprises at least one second electrochemical processors, wherein a first second electrochemical processor comprises at least one first electrical bypass, which electrically interconnects a contact point—which is arranged at the electrical interconnection of the first second electrochemical processor with the conductive pathway—with the second electrode or, if present, a third electrode, the migration electrode or the subsystem of the first electrochemical processor, thereby electrically connecting the external conductive pathway with the second electrode or, if present, the third electrode, the migration electrode or the subsystem of the first electrochemical processor;
and the at least one further second electrochemical processor is electrically bypassed via at least one further electrical bypass which electrically interconnects a contact point, which is arranged at the electrical interconnection of the at least one further electrochemical processor, with a contact point, which is arranged at the electrical interconnection of the preceding second electrochemical processor with the second electrode or, if present, the third electrode, the migration electrode or the subsystem of the first electrochemical processor.

14. The two-dimensional electrochemical writing assembly according to claim 13, wherein with respect to the x-direction of the second electrode or, if present, the third electrode, the migration electrode or the subsystem of the first electrochemical processor, the electrical connection of the at least one electrical bypass is arranged before the respective electrical connection.

15. The two-dimensional electrochemical writing assembly according to claim 13, wherein the contact point is aligned between the resistive element and the first electrode of the at least one second electrochemical processor.

16. The two-dimensional electrochemical writing assembly according to claim 13, wherein the at least one second electrochemical processor comprises a third electrode, wherein each of the at least one second electrochemical processor comprises
   a) at least one electrical bypass, which electrically interconnects the second electrode or, if present, the third electrode, the migration electrode or the subsystem of the first electrochemical processor with the second electrode of the respective second electrochemical processor and
   b) at least one further electrical interconnection, electrically interconnecting the third electrode of the respective second electrochemical processor with the second electrode of the first electrochemical processor.

17. The two-dimensional electrochemical writing assembly according to claim 16, wherein with respect to the x-direction of the second electrode or, if present, the third electrode, the migration electrode or the subsystem of the first electrochemical processor, each of the electrical connections of the at least one electrical bypass is arranged before the respective electrical connection.

18. The two-dimensional electrochemical writing assembly according to claim 1, wherein the writing assembly is embedded in a sheet.

19. The two-dimensional electrochemical writing assembly according to claim 1, wherein the writing assembly is embedded in foil.

20. Use of the writing assembly according to claim 1 as time dependent temperature display, as etiquette, as plaster, as part of packages or for monitoring of temperatures, such as body temperature.

* * * * *